(12) United States Patent
Chu et al.

(10) Patent No.: US 11,296,361 B2
(45) Date of Patent: Apr. 5, 2022

(54) BIPOLAR BATTERY DESIGN

(71) Applicant: Apple Inc., Cupertino, CA (US)

(72) Inventors: Andrew C. Chu, Cupertino, CA (US);
Qingcheng Zeng, San Jose, CA (US);
Donald G. Dafoe, San Jose, CA (US);
Steven Kaye, Oakland, CA (US)

(*) Notice: Subject to any disclaimer, the term of this patent is extended or adjusted under 35 U.S.C. 154(b) by 0 days.

(21) Appl. No.: 15/742,009

(22) PCT Filed: Jul. 6, 2016

(86) PCT No.: PCT/US2016/041151
§ 371 (c)(1),
(2) Date: Jan. 4, 2018

(87) PCT Pub. No.: WO2017/007827
PCT Pub. Date: Jan. 12, 2017

(65) Prior Publication Data
US 2018/0205118 A1 Jul. 19, 2018

Related U.S. Application Data

(60) Provisional application No. 62/189,545, filed on Jul. 7, 2015.

(51) Int. Cl.
*H01M 10/0585* (2010.01)
*H01M 4/70* (2006.01)
(Continued)

(52) U.S. Cl.
CPC ....... *H01M 10/0585* (2013.01); *H01M 4/366* (2013.01); *H01M 4/70* (2013.01);
(Continued)

(58) Field of Classification Search
CPC ......... H01M 10/0525; H01M 10/0585; H01M 10/4257; H01M 10/482; H01M 10/613; H01M 10/647; H01M 10/6555; H01M 10/6557; H01M 2/08; H01M 2/1646; H01M 2/1653; H01M 2/1686; H01M 2/348; H01M 4/70
See application file for complete search history.

(56) References Cited

U.S. PATENT DOCUMENTS 4,317,864 A * 3/1982 Strasser ................ H01M 8/247
429/457
4,374,186 A 2/1983 McCartney et al.
(Continued)

FOREIGN PATENT DOCUMENTS

CN 1620735 A 5/2005
CN 101809801 A 8/2010
(Continued)

OTHER PUBLICATIONS

PCT/US2016/041151, "International Search Report and Written Opinion", dated Aug. 25, 2016, 10 pages.
(Continued)

*Primary Examiner* — Edward J. Schmiedel
(74) *Attorney, Agent, or Firm* — Kilpatrick Townsend & Stockton

(57) ABSTRACT

A bipolar battery including a first electrochemical cell and a second electrochemical cell is provided.

18 Claims, 17 Drawing Sheets

(51) Int. Cl.

| | | |
|---|---|---|
| *H01M 10/42* | (2006.01) | |
| *H01M 10/48* | (2006.01) | |
| *H01M 10/647* | (2014.01) | |
| *H01M 10/6557* | (2014.01) | |
| *H01M 10/659* | (2014.01) | |
| *H01M 4/36* | (2006.01) | |
| *H01M 10/04* | (2006.01) | |
| *H01M 10/052* | (2010.01) | |
| *H01M 50/183* | (2021.01) | |
| *H01M 50/411* | (2021.01) | |
| *H01M 50/431* | (2021.01) | |
| *H01M 50/449* | (2021.01) | |
| *H01M 50/581* | (2021.01) | |
| *H01M 10/613* | (2014.01) | |
| *H01M 10/6555* | (2014.01) | |
| *H01M 10/0525* | (2010.01) | |
| *H01M 4/02* | (2006.01) | |

(52) U.S. Cl.
CPC ..... *H01M 10/044* (2013.01); *H01M 10/0418* (2013.01); *H01M 10/052* (2013.01); *H01M 10/0525* (2013.01); *H01M 10/4235* (2013.01); *H01M 10/4257* (2013.01); *H01M 10/482* (2013.01); *H01M 10/613* (2015.04); *H01M 10/647* (2015.04); *H01M 10/659* (2015.04); *H01M 10/6555* (2015.04); *H01M 10/6557* (2015.04); *H01M 50/183* (2021.01); *H01M 50/411* (2021.01); *H01M 50/431* (2021.01); *H01M 50/449* (2021.01); *H01M 50/581* (2021.01); *H01M 2004/029* (2013.01); *H01M 2010/4271* (2013.01); *H01M 2200/106* (2013.01)

(56) References Cited

U.S. PATENT DOCUMENTS

| | | | |
|---|---|---|---|
| 4,567,119 | A | 1/1986 | Lim |
| 5,162,172 | A | 11/1992 | Kaun |
| 5,254,415 | A | 10/1993 | Williams et al. |
| 5,367,431 | A | 11/1994 | Kunishi et al. |
| 6,004,698 | A | 12/1999 | Richardson et al. |
| 8,124,266 | B2 | 2/2012 | Yamazaki |
| 8,153,410 | B2 | 4/2012 | Jaffe |
| 8,357,469 | B2 | 1/2013 | Shaffer, II et al. |
| 8,663,833 | B2 | 3/2014 | Hosaka et al. |
| 9,142,811 | B2 | 9/2015 | Chami |
| 10,916,741 | B1 | 2/2021 | Dafoe et al. |
| 10,916,796 | B1 | 2/2021 | Zeilinger et al. |
| 10,923,728 | B1 | 2/2021 | Zeng |
| 11,018,343 | B1 | 5/2021 | Dafoe et al. |
| 11,043,703 | B1 | 6/2021 | Zeng et al. |
| 11,189,834 | B1 | 11/2021 | Zeng |
| 2002/0146620 | A1* | 10/2002 | Connell ............... H01M 2/0277 429/161 |
| 2003/0027051 | A1 | 2/2003 | Kejha et al. |
| 2003/0096170 | A1 | 5/2003 | Fujiwara et al. |
| 2005/0019643 | A1* | 1/2005 | Sugita ................. H01M 8/2457 429/470 |
| 2005/0106456 | A1 | 5/2005 | Puester et al. |
| 2007/0210760 | A1* | 9/2007 | Shimamura ......... H01M 2/1077 320/135 |
| 2009/0023059 | A1* | 1/2009 | Kinoshita ........... H01M 2/1072 429/153 |
| 2009/0068531 | A1 | 3/2009 | Sawa et al. |
| 2009/0136832 | A1 | 5/2009 | Aihara et al. |
| 2009/0233175 | A1 | 9/2009 | Kelley et al. |
| 2010/0134942 | A1* | 6/2010 | Wang .................. H01C 1/1406 361/93.7 |
| 2011/0294007 | A1 | 12/2011 | Hosaka et al. |
| 2012/0156552 | A1 | 6/2012 | Miyazaki et al. |
| 2012/0189896 | A1 | 7/2012 | Zhou et al. |
| 2012/0263995 | A1 | 10/2012 | Naito et al. |
| 2013/0065106 | A1 | 3/2013 | Faust et al. |
| 2013/0089774 | A1 | 4/2013 | Chami |
| 2014/0127542 | A1 | 5/2014 | Li et al. |
| 2014/0154542 | A1 | 6/2014 | Issaev et al. |
| 2015/0325894 | A1 | 11/2015 | Merriman et al. |
| 2016/0049646 | A1 | 2/2016 | Fujiki et al. |
| 2016/0049679 | A1 | 2/2016 | Stevens et al. |
| 2016/0099456 | A1 | 4/2016 | Kwon et al. |
| 2016/0111729 | A1 | 4/2016 | Kim et al. |
| 2016/0197352 | A1 | 7/2016 | Blaser et al. |
| 2016/0248113 | A1 | 8/2016 | He et al. |
| 2016/0329535 | A1 | 11/2016 | Moomaw et al. |
| 2017/0133689 | A1 | 5/2017 | Moore et al. |
| 2017/0214057 | A1 | 7/2017 | Kotik et al. |
| 2018/0013144 | A1 | 1/2018 | Li et al. |
| 2018/0226654 | A1 | 8/2018 | Ohsawa et al. |
| 2018/0316063 | A1 | 11/2018 | Masel et al. |
| 2019/0036147 | A1 | 1/2019 | Yuan et al. |
| 2019/0237748 | A1 | 8/2019 | Shin et al. |
| 2020/0028166 | A1 | 1/2020 | Tanaka et al. |

FOREIGN PATENT DOCUMENTS

| | | |
|---|---|---|
| CN | 102005566 A | 4/2011 |
| CN | 102187504 A | 9/2011 |
| CN | 102272977 A | 12/2011 |
| CN | 102341948 A | 2/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103904294 A | 7/2014 |
| EP | 1125336 A1 | 8/2001 |
| EP | 2892097 A1 | 7/2015 |
| EP | 3425473 A1 | 1/2019 |
| JP | 06503442 A | 4/1994 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018519646 A | 7/2016 |
| KR | 20130066795 A | 6/2013 |
| WO | 8504287 | 9/1985 |
| WO | 9210861 A1 | 6/1992 |
| WO | 2010111087 A1 | 9/2010 |
| WO | 2016031689 A1 | 3/2016 |
| WO | 2017007827 | 1/2017 |
| WO | 2017007827 A1 | 1/2017 |
| WO | 2018057566 A1 | 3/2018 |
| WO | 2018195372 A1 | 10/2018 |
| WO | 2018213601 A2 | 11/2018 |

OTHER PUBLICATIONS

International Patent Application No. PCT/US2017/052413, "International Preliminary Report on Patentability", dated Apr. 4, 2019, 12 pages.
PCT/US2016/041151, "International Preliminary Report on Patentability", dated Jan. 18, 2018, 8 pages.
Korean Patent Application No. 10-2018-7000263, "Office Action", dated Feb. 28, 2019, 5 pages.
Korea Patent Application No. 10-2018-7000263, "Office Action", dated Sep. 27, 2019, 16 pages.
PCT/US2018/028472, "International Preliminary Reporton Patentability", dated Oct. 31, 2019, 10 pages.
Japan Patent Application No. 2018-500449, "Office Action", dated Jan. 21, 2019, 12 pages.

(56) References Cited

OTHER PUBLICATIONS

PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
Europe Patent Application No. 16738994.9, "Communication Pursuant to Rules 161(1) and 162 EPC", dated Mar. 23, 2018, 3 pages.
U.S. Appl. No. 16/263,890, "Non-Final Office Action", dated Jun. 16, 2020, 9 pages.
U.S. Appl. No. 15/962,133, "Final Office Action", dated Jul. 7, 2020, 23 pages.
PCT/US2018/033218, "International Preliminary Report on Patentability", dated Nov. 28, 2019, 9 pages.
U.S. Appl. No. 16/108,498, "Non-Final Office Action", dated Apr. 30, 2020, 28 pages.
U.S. Appl. No. 16/273,625, "Non-Final Office Action", dated May 4, 2020, 54 pages.
U.S. Appl. No. 16/007,534, "Non-Final Office Action", May 5, 2020, 47 pages.
U.S. Appl. No. 15/962,133, "Non-Final Office Action", dated Jan. 21, 2020, 37 pages.
U.S. Appl. No. 16/049,250, "Non-Final Office Action", dated Apr. 8, 2020, 8 pages.
U.S. Appl. No. 16/038,865, "Non-Final Office Action", dated Nov. 6, 2020, 13 pages.
U.S. Appl. No. 16/108,503, "Non-Final Office Action", dated Oct. 2, 2020, 11 pages.
U.S. Appl. No. 16/049,250, "Notice of Allowance", dated Oct. 7, 2020, 7 pages.
U.S. Appl. No. 16/108,522, "Non-Final Office Action", dated Sep. 9, 2020, 10 pages.
EP16738994.9, "Notice of Decision to Grant", dated Sep. 24, 2020, 2 pages.
U.S. Appl. No. 16/263,890, "Notice of Allowance", dated Oct. 23, 2020, 8 pages.
U.S. Appl. No. 15/962,133, "Notice of Allowance", dated Feb. 9, 2021, 13 pages.
U.S. Appl. No. 16/007,534, "Notice of Allowance", dated Nov. 18, 2020, 7 pages.
U.S. Appl. No. 16/108,498, "Final Office Action", dated Dec. 9, 2020, 25 pages.
U.S. Appl. No. 16/108,522, "Notice of Allowance", dated Feb. 26, 2021, 8 pages.
U.S. Appl. No. 16/273,625, "Final Office Action", dated Feb. 16, 2021, 14 pages.
China Patent Application No. 201680039891.9, "Office Action", dated Oct. 27, 2020, 8 pages.
PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion- And Cation-Exchange Membranes as Separators", Energy, vol. 167, Jan. 15, 2019, pp. 1011-1018.
China Patent Application No. 201780053071.X, "Office Action", dated Apr. 16, 2021, 21 pages.
U.S. Appl. No. 16/038,865, "Final Office Action", dated Jun. 1, 2021, 7 pages.
U.S. Appl. No. 16/108,498, "Non-Final Office Action", dated May 17, 2021, 21 pages.
U.S. Appl. No. 16/108,503, "Final Office Action", dated May 25, 2021, 9 pages.
U.S. Appl. No. 16/522,475, "Non-Final Office Action", dated May 17, 2021, 17 pages.
U.S. Appl. No. 16/683,088, "Notice of Allowance", dated Nov. 22, 2021, 8 pages.
U.S. Appl. No. 16/038,865, "Notice of Allowance", dated Aug. 13, 2021, 8 pages.
U.S. Appl. No. 16/683,088, "Final Office Action", dated Oct. 12, 2021, 12 pages.
U.S. Appl. No. 16/683,088, "Non-Final Office Action", dated Sep. 2, 2021, 10 pages.
U.S. Appl. No. 16/683,091, "Non-Final Office Action", dated Aug. 18, 2021, 22 pages.
Boeva, et al., "Soluble and Highly Ionically Conducting Interpolyelectrolyte Complexes Prepared via Chemical Template Polymerization of Aniline in the Presence of Perfluorinated Polysulfonic Acid", The Royal Society of Chemistry, vol. 4, No. 100, Oct. 2014, pp. 56677-56681.
China Patent Application No. 201780053071.X, "Office Action", dated Nov. 2, 2021, 20 pages.
Thuc, et al., "Study on Synthesis and Characterization of Anion Exchange Membrane Based on Poly (Vinyl Alcohol) Modified by Free-Radical Polymerization", International Journal of Electrochemical Science, vol. 15, Aug. 2020, pp. 8190-8199.

\* cited by examiner

BIPOLAR BATTERY DESIGN

PRIORITY

This patent application is a National Stage application of PCT/US2016/041151 filed on Jul. 6, 2016; which claims the benefit of U.S. Provisional Patent Application No. 62/189,545, filed Jul. 7, 2015, the full disclosure of which are incorporated herein by reference in their entirety.

FIELD

The described embodiments relate generally to batteries. More particularly, the embodiments relate to bipolar battery cells.

BACKGROUND

Bipolar batteries use a design where multiple individual electrochemical cells are stacked with bipolar plates serially connecting the electrochemical cells. Typically, each bipolar plate has a positive electrode material on a first side of the bipolar plate and a negative electrode material on a second side of the bipolar plate. As such, when a bipolar plate separates two neighboring electrochemical cells, it acts as a negative current collector plate for one electrochemical cell and as a positive current collector plate for the second electrochemical cell. The bipolar plate allows current to flow between adjacent electrochemical cells during charging and discharging, and also provides electrochemical isolation between electrochemical cells, such that ionic flow does not occur between adjacent electrochemical cells through the bipolar plate. Compared to conventional monopolar battery cells (in which metal tabs are used to connect current collector plates of battery cells connected in series), the electrons travel a very short distance across the bipolar plate, rather than external to the cell via metal tabs. This may result in a more uniform current density and a higher power design.

SUMMARY

Embodiments in accordance with the disclosure provide a seal design for a bipolar battery that separates the functions of 1) electrochemically isolating an electrochemical cell from the other electrochemical cells in the stack, and 2) accommodating expansion of the battery in the z-direction perpendicular to the collector plates. In the various embodiments, the bipolar battery includes electrochemical cells having a bipolar plate (also referred to as bipolar foil) that is separated into two layers at the perimeter of the electrode stack, where the seal is made.

In some embodiments, a bipolar battery comprises a first electrochemical cell, a second electrochemical cell, and a bipolar plate connecting the first electrochemical cell to the second electrochemical cell. The bipolar plate has a first metal layer and a second metal layer. The bipolar plate has a connection region and a gap region, wherein a separation distance between the first and second metal layers is larger in the gap region than in the connection region. The electrochemical cells include a cathode and an anode, which are spaced apart by a separator disposed there between. Each electrochemical cell can also be electrochemically isolated by having a seal that hermetically seals the electrochemical cell.

In other embodiments, a bipolar battery comprises a plurality of electrochemical cells, a plurality of bipolar plates, and a plurality of seals. Each electrochemical cell has a cathode, a separator, and an anode. The bipolar plates form boundaries between neighboring electrochemical cells. Each bipolar plate has a first metal layer that forms a side of a first electrochemical cell and a second metal layer that forms a side of a second electrochemical cell. The peripheral ends of the first and second metal layers are spaced apart, creating a gap region between the first and second metal layers. Each electrochemical cell of the battery includes a seal. Each seal is disposed between a peripheral end of a second metal layer of a first bipolar plate of one electrochemical cell and a peripheral end of the first metal layer of a second adjacent bipolar plate of a second electrochemical cell.

In other embodiments, a bipolar battery is configured to include both a plurality of electrochemical seals and a plurality of flexible seals. The bipolar battery can comprise a plurality of electrochemical cells, each electrochemical cell having a cathode, a separator, and an anode; a plurality of bipolar plates; a plurality of electrochemical seals; and a plurality of elastomer seals. Each bipolar plate is disposed between adjacent electrochemical cells, forming a border between neighboring electrochemical cells. Each bipolar plate has a first metal layer that forms a side of a first electrochemical cell and a second metal layer that forms a side of a second electrochemical cell. The peripheral ends of the first and second metal layers are spaced apart creating a gap region between the first and second metal layers. Each electrochemical seal is disposed between a peripheral end of a second metal layer of a first bipolar plate and a peripheral end of the first metal layer of a second adjacent bipolar plate. Each flexible seal is disposed in the gap region between the peripheral ends of the first and second metal layers.

In various aspects, the first or second metal layer can be operably connected to a balancing circuit. In various aspects, a reference electrode can be operably connected to the cathode of the first cell.

In another embodiment, the bipolar battery can include first and second cell stacks separated by end plates. A first cell stack includes a first cell and a second cell. The first cell stack is disposed between a first conductive plate and a second conductive plate. The second cell stack includes a third cell and a fourth cell. The second cell stack is disposed between the second conductive plate and a third conductive plate. In various embodiments, one or more of the plates can include fluidly conductive holes. The holes can be used, for example, for cooling fluid that can thermally cool the plates and thereby the bipolar battery.

In various aspects, the bipolar batteries can include one or more thermally sensitive layers that, upon reaching a certain temperature or range of temperatures, increase the electrical resistance of the bipolar battery and inhibit, reduce, or prevent ion flow and production of power. In one variation, a thermally sensitive layer can be disposed on the first or second metal layer of the bipolar battery. The thermally conductive layer can be disposed on either side of each layer. In further variations, a ceramic can be disposed on the thermally conductive layer on either or both of the first or second metal layer.

In various aspects, the bipolar battery can include one or more porous layers disposed between the metal layers and electrodes of the cells. The porous layers can allow flow of electrolyte to the electrodes.

In additional variations, a barrier layer can be disposed at the terminus of the gap region of the bipolar plate. In some variations, the first metal plate and the second metal plate can be connected directly to the separator. For example, the first metal layer and the second metal layer can be bonded to the separator in the gap region. Alternatively, the first metal layer and the second metal layer can be bonded to the barrier layer in the gap region.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
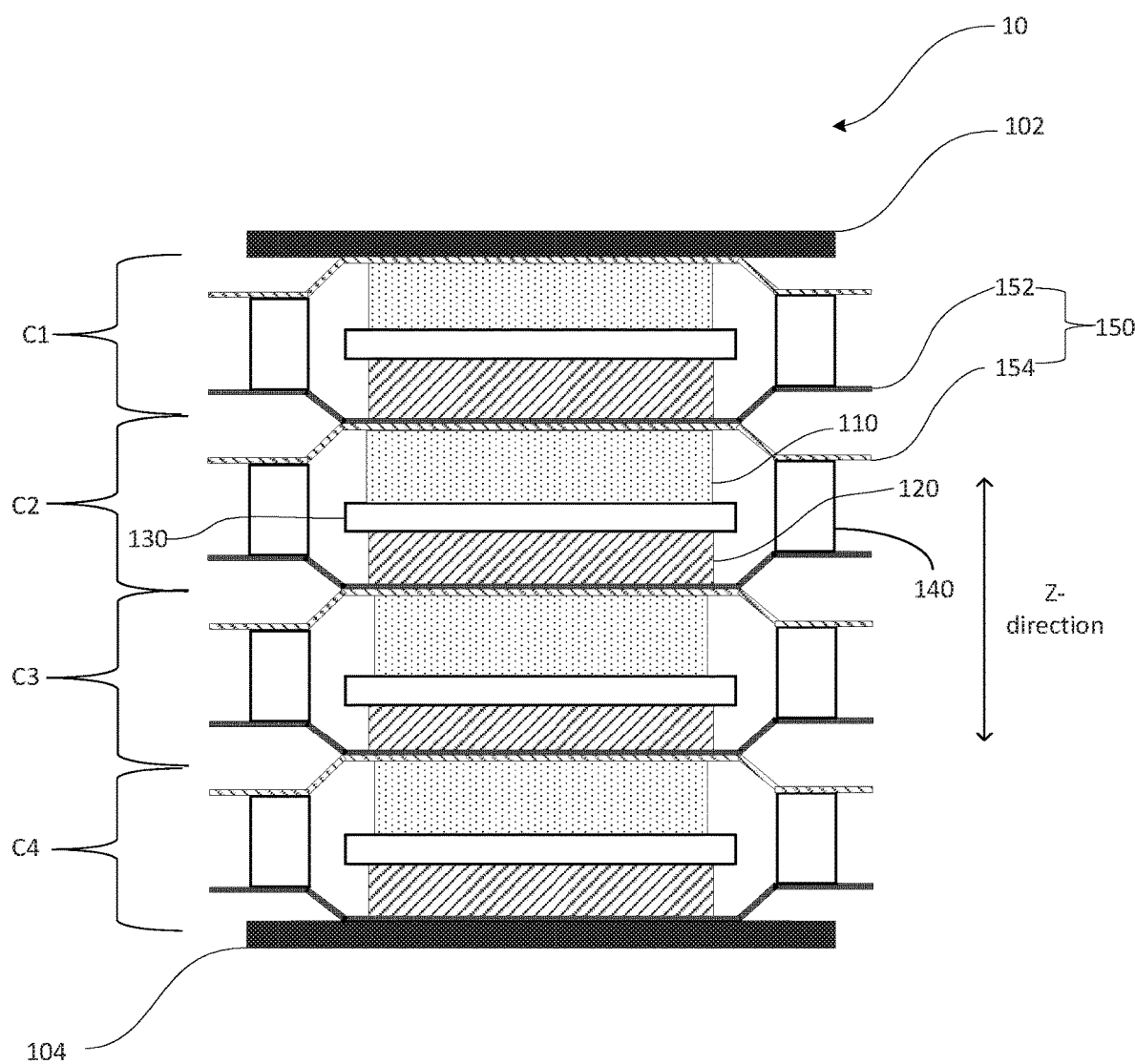
FIG. 1 depicts a schematic longitudinal sectional view of a bipolar battery in accordance with embodiments the disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to bipolar batteries. As discussed here, a bipolar battery cell may comprise a plurality of stacked electrochemical cells. The stacked electrochemical cells are serially connected using one or more bipolar plates. The bipolar battery cell may include a first conductive plate at a first end of the stack and a second conductive plate at a second end of the stack, which may act as first and second current collector plates, respectively, for the bipolar battery cell, and between which current may flow to charge or discharge the plurality of electrochemical cells. Each bipolar plate may allow current to flow between neighboring electrochemical cells, such that the bipolar plate acts as a negative current collector plate of one electrochemical cell and acts as the positive plate of a neighboring electrochemical cell. Thus, current may flow in a first direction across a bipolar plate during charging of the bipolar battery and may flow in an opposite direction across the bipolar plate during discharging of the bipolar battery.

In various aspects, the disclosure relates to the bipolar plates and seals of the electrochemical cells in a bipolar battery. Embodiments in accordance with the disclosure provide a bipolar plate and cell seal design for a bipolar battery that accommodates expansion in a z-direction perpendicular to the bipolar plates (e.g., expansion in a direction along which the individual electrochemical cells are stacked). In the various embodiments, the bipolar battery includes a bipolar plate that is separated into two layers at the perimeter of the electrode stack. One or more seals may be made at the perimeter (e.g., between the layers of the bipolar plate or between the bipolar plate and a neighboring bipolar plate).

In some embodiments, a bipolar battery comprises a first electrochemical cell, a second electrochemical cell, and a bipolar plate connecting the first electrochemical cell to the second electrochemical cell. The bipolar plate has a first metal layer (e.g., a first foil) and a second metal layer (e.g., a second foil). The bipolar plate has a connection region and a gap region, wherein a separation distance between the first and second metal layers is larger in the gap region than the connection region. The electrochemical cells include a cathode and an anode, which are spaced apart by a separator disposed there between. Each electrochemical cell can also be electrochemically isolated by having a seal that hermetically seals the electrochemical cell. Bipolar batteries having such a mono cell stack (MCS) design can allow several cells to be stacked in series.

In other embodiments, a bipolar battery comprises a plurality of electrochemical cells, a plurality of bipolar plates, and a plurality of seals. Each electrochemical cell includes a cathode, a separator, and an anode. The bipolar plates form boundaries between neighboring electrochemical cells. Each bipolar plate has a first metal layer that forms a side of a first electrochemical cell and a second metal layer that forms a side of a second electrochemical cell. The peripheral ends of the first and second metal layers are spaced apart creating a gap region between the first and second metal layers. Each electrochemical cell of the battery may include a seal, which may hermetically seal the electrochemical cell. The seal may connect a first and second plate of the electrochemical cell to enclose the anode, cathode, and separator of the electrochemical cell between the first and second plates. A seal may be disposed, for example, between a peripheral end of a second metal layer of a first bipolar plate and a peripheral end of the first metal layer of a second adjacent bipolar plate.

In other embodiments, a bipolar battery is configured with both electrochemical seals and flexible seals. The bipolar battery can comprise a plurality of electrochemical cells, a plurality of bipolar plates, a plurality of electrochemical seals, and a plurality of elastomer seals. Each electrochemical cell includes a cathode, a separator, and an anode. Each bipolar plate is disposed between adjacent electrochemical cells forming a border between neighboring electrochemical cells. Each bipolar plate has a first metal layer that forms a side of a first electrochemical cell and a second metal layer that forms a side of a second electrochemical cell. The peripheral ends of the first and second metal layers are spaced apart, creating a gap region between the first and second metal layers. Each electrochemical seal is disposed between a peripheral end of a second metal layer of a first bipolar plate and a peripheral end of the first metal layer of a second adjacent bipolar plate. Each flexible seal is disposed in the gap region between the peripheral ends of the first and second metal layers.

One challenge of bipolar batteries is electrically isolating each pair of anode and cathode electrodes in the neighboring electrochemical cell. This means that a seal of an electrochemical cell should provide hermetic sealing to prevent the electrolyte from leaking out of an electrochemical cell. The seal can provide a barrier to the electrolyte, so that neighboring electrochemical cells do not short. The seal can also prevent moisture from centering the electrochemical cell, which can affect electrochemical cell performance.

Additionally, in traditional bipolar battery design, the seal should be able to accommodate electrode swelling and expansion in the z-direction perpendicular to the bipolar plate. For example, after electrolyte filling and cycling or usage, the electrode stack swells, creating expansion in the z-direction. This expansion creates a strain that can be accommodated by the seal and packaging. When the cathode-anode pairs in a bipolar design are stacked one on top of another, the volume change in the z-direction adds with each subsequent cathode-anode pair. When several pairs are stacked up, the resulting strain in the z-direction (e.g., the direction along which the individual electrochemical cells are stacked) can be difficult to accommodate, because the bipolar plate can maintain a seal with the packaging while flexing to handle the electrochemical cell expansion, up to 10%, in the z-direction.

For lithium ion chemistries, the seal can allow a feedthrough, or current collector tab, to extend outside of the electrochemical cell for cell balancing.

The different functions of a seal can compete with each other. Thus, the embodiments described herein separate the functions of the seal: 1) maintaining electrochemical isolation by preventing electrolyte and moisture from penetrating the battery, while also 2) accommodating the expansion in the z-direction due to swelling.

In the various embodiments, the bipolar battery includes electrochemical cells having a bipolar plate that is separated into two layers at the perimeter of the electrode stack, where the seal is located. In some embodiments, the bipolar plate can comprise two metal layers of different materials, such as, but not limited to, aluminum and copper. In other embodiments, the metal layers of the bipolar plate can be the same metal. Within the perimeter of the electrode stack, the two metal layers can be connected (e.g., welded or joined using some electrically-conductive adhesive) to form a connection region. Within the connection region, current may flow between the metal layers to allow current flow between neighboring electrochemical cells. Outside of the sealed electrochemical cells in the stack, the two layers can be separated to provide a space between the layers to create a gap region. Within the gap region, the two layers may move away from each other as the electrochemical cells expand during use. Thereby, each cathode-anode pair may be electrochemically sealed and isolated from the neighboring electrochemical cells, while the gap region provides flexibility to accommodate expansion in the z-direction. In some embodiments, a multi-seal design can be used. The multi-seal design includes a seal for electrochemically isolating the electrochemical cells and a flexible seal, disposed in the gap region, to further accommodate the expansion in the z-direction (e.g., expansion in a direction along which the individual electrochemical cells are stacked).

These and other embodiments are discussed below with reference to FIGS. 1-17. However, those skilled in the art will readily appreciate that the detailed description given herein with respect to these Figures is for explanatory purposes only and should not be construed as limiting.

FIG. 1 depicts a schematic longitudinal sectional view of a bipolar battery in accordance with embodiments the disclosure. As illustrated, the bipolar battery 10 comprises a stack of electrochemical cells C1, C2, C3, and C4 between end plates 102 and 104. End plates 102 and 104 can be metal current collector plates, which serve both electrical and mechanical functions. In some embodiments, end plates 102 and 104 can be support plates that form part of an external housing of the bipolar battery. In some embodiments, end plates 102 and 104 may provide mechanical support within a housing of the bipolar battery. In some embodiments, some or all of the support plates may be electrically conductive (e.g., there may be a terminal within the support plate that is electrically connected to the end plate). In some embodiments, end plates 102 and 104 can act as positive and negative terminals of the battery.

The stack of electrochemical cells can include any number of electrochemical cells depending on the selected voltage for the battery 10, along with the individual voltage of each individual electrochemical cell. The cell stack can be arranged with as many or as few electrochemical cells in series as desired. For example, numerous electrochemical cells, including cathode-anode pairs, may be placed in series to form a battery unit that has a voltage output selected for an intended use of the battery unit.

Each electrochemical cell C can include a cathode 110 and an anode 120, where the cathode 110 and anode 120 are separated by separator 130 between the cathode and anode. Between the anode 120 of cell C1 and the cathode of adjacent cell C2 is a bipolar plate 150. By way of illustration, in some embodiments, a first cell C1 and a second cell C2 are connected by a bipolar plate 150 between C1 and C2. The bipolar plate 150 forms part of C1 and C2. On one side, bipolar plate 150 may be connected to the seal 140 of C1 and connected on an opposing side to the seal 140 of C2.

Figure 2A:
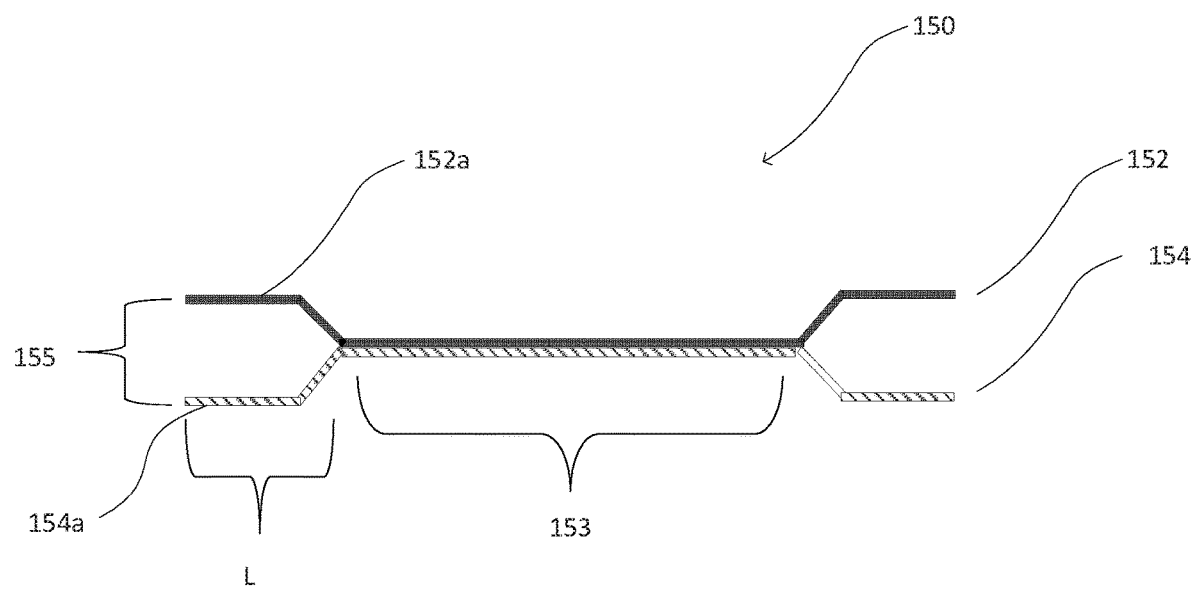
FIG. 2A depicts a longitudinal sectional view of a bipolar plate with a first metal layer and a second metal layer in accordance with embodiments the disclosure.

In some embodiments, as shown in FIG. 1, bipolar plate 150 can include a first metal layer 152 and a second metal layer 154. As shown in FIG. 2A, in some embodiments, the first metal layer 152 and second metal layer 154 can be different materials. In some embodiments, the first metal layer 152 is a material selected based on the potential of the anode 120, such as copper or any other suitable metal. The second metal layer is a material selected based on the potential of the cathode 110, such as aluminum or other suitable metals. In other words, the materials for the first and second metal layers can be selected based upon the materials that are selected for the anode and cathodes.

The first and second metal layers can be made of any material known in the art. For example, copper, aluminum (e.g., 7000 series aluminum), or stainless steel may be used. In instances where one or more metal layers have higher impedance than other conductive metals, the metals used in the first and second metal layer can be the same or different. Likewise, the metal layers can be solid layers or can be a metallic mesh. By using less electrically conductive metals (e.g., steel instead of copper) for the first and second metal layers, there can be a smaller area of a metal layer affected by thermal hot spots. Further, thermal conductivity can be reduced, and thereby the likelihood of thermal runaway between cells can be reduced.

The materials selected for the anode and cathode can be any suitable battery materials. By way of illustration, without intending to be limiting, the anode material can be silicon, graphite, carbon, a tin alloy, a lithium containing material, such as lithium titanium oxide (LTO), or other suitable materials that can form an anode in a bipolar battery cell. By way of illustration, without intending to be limiting, the cathode material can be a lithium-containing material. In some embodiments, the lithium-containing material can be a lithium metal oxide, such as lithium cobalt oxide, lithium manganese oxide, lithium nickel manganese cobalt oxide, Lithium Nickel Cobalt Aluminum Oxide, Lithium Titanate, while in other embodiments, the lithium-containing material can be a lithium iron phosphate, a lithium metal polymer, or other suitable cathode material for bipolar battery cells known to one of skill in the art.

The first and second metal layers can have any suitable thickness that allows for a hermetic seal to be formed and provides suitable mechanical stability to prevent failure (i.e. breakage of the layers) during anticipated usage of the bipolar battery. Additionally, the thickness of the metal layers can be sufficiently thin to allow for bending and flexing in the separation region to accommodate expansion anticipated during cycling of the bipolar battery (e.g., up to 10% expansion in the z-direction).

In some embodiments, the metal layers have a thickness of at least 5 µm. In other embodiments, the metal layers have a thickness of at least 10 µm. In other embodiments, the metal layers have a thickness of at least 20 µm. In other embodiments, the metal layers have a thickness of less than 50 µm. In other embodiments, the metal layers have a thickness of less than 30 µm. In some embodiments, the first metal layer and the second metal layer of the bipolar plate may be the same thickness, while in other embodiments the first metal layer second metal layer may have different thicknesses.

As shown in FIGS. 1 and 2A, the bipolar plate 150 has a connection region 153 where the first metal layer 152 and second metal layer 154 are connected, and a gap region 155 at the peripheral ends of the collector 150. In the connection region 153, the first metal layer and second metal layer are joined to be electrically-conductive. In some embodiments, the first metal layer and second metal layer can be directly connected, while in other embodiments the first metal layer and second metal layer can be indirectly connected via a conductive material. To form the connection region 153, the first metal layer 152 and the second metal layer 154 can be laminated together, in some embodiments. In other embodiments, the connection region 153 can be created by welding the first metal layer 152 and the second metal layer 154 together. In still other embodiments, the connection region 153 can be created by using an adhesive, which is electrically conductive, between the first metal layer 152 and the second metal layer 154 together. In yet other embodiments, the connection region 153 can be created by the wetting that can occur between the materials of the first metal layer 152 and the second metal layer 154.

In the gap region 155, the peripheral ends of the first layer 152 and the second layer 154 are spaced apart and moveable relative to each other. As such, there is a separation distance between the first and second metal layers, which can increase as the electrochemical cell swells. The separation distance between the first and second metal layers is larger in the gap region 155 than the connection region 153. In some embodiments, there may be times where the spacing in the gap region 155 is the same as the spacing in the connection region 153. For example, the battery 10 may be initially formed with the peripheral ends of the first layer 152 and the second layer 154 being in contact but movable respective to each other. As such, as the electrochemical cell initially swells, the peripheral ends of the first layer 152 and the second layer 154 can move and the spacing in the gap region can increase.

Figure 2B:
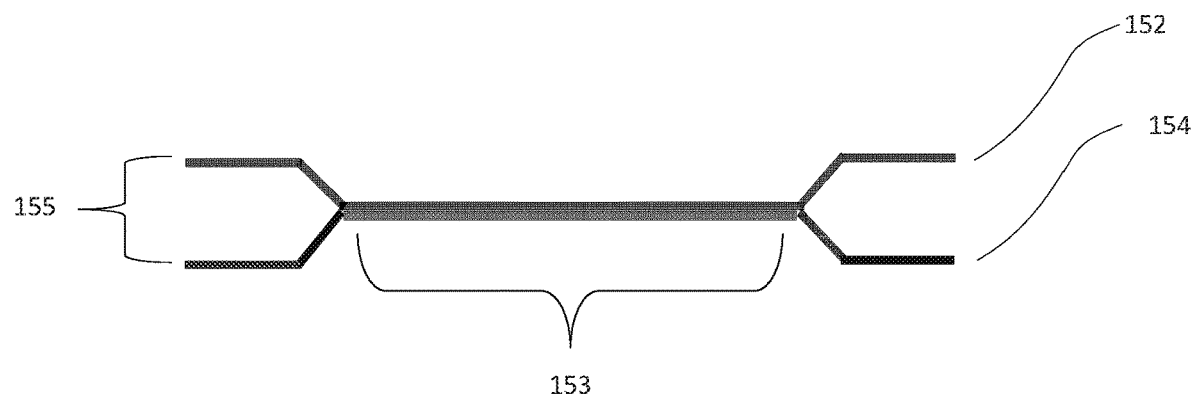
FIG. 2B depicts a longitudinal sectional view of another bipolar plate with a first metal layer and a second metal layer in accordance with embodiments the disclosure.

In some embodiments, the spaced apart peripheral ends of the first metal layer 152 and the second metal layer 154 are of a length that is sufficient to accommodate an anticipated expansion of the individual electrochemical cells of the bipolar battery during cycling of the battery. In other words, the peripheral ends 152a and 154a have a length L, as shown in FIG. 2A. In some embodiments, the length L is long enough that up to 10% expansion in the z-direction can be accommodated. In other embodiments, the length L is long enough that at least 20% expansion in the z-direction can be accommodated. In still other embodiments, the length L is long enough that at least 30% expansion in the z-direction can be accommodated. The length L can also be selected to provide a space between the ends of the cathode and anode, and the seal to provide a spacing for gases that may result from degassing of the electrolyte. In other embodiments, as illustrated in FIG. 2B, the bipolar plate can have a first metal layer and a second metal layer that comprise the same metal.

As shown in FIG. 1, each cell C1, C2, C3, and C4, also includes a seal 140 to electrochemically isolate the electrochemical cells from each other. Thus, each cathode-anode pair is electrochemically sealed and isolated from neighboring electrochemical cells. Because the metal layers 152 and 154 are separated at the peripheral ends, separate seals 140 can be formed on opposing sides (i.e. the top and bottom) of the bipolar plate 150.

The seal material can be able to bond with the first and second metal layers of the bipolar plate to prevent electrolyte leakage. The electrolyte can be a solid, a gel, or a liquid. The seal can electrochemically isolate each electrochemical cell by hermetically sealing the cell, thereby preventing ions in the electrolyte from escaping to a neighboring electrochemical cell. The seal material can be any material (e.g. polymers or epoxies) that has good bonding with the metal layers such that the hermetic seal can be maintained through a predetermined period of time or battery usage. For example, in some embodiments, the hermeticity of the seal may be maintained for at least 10 years. In other embodiments, the hermeticity of the seal may be maintained for at least 15 years.

The separator can be soaked with the electrolyte, such as a fluid electrolyte or gel electrolyte, to incorporate the electrolyte into the bipolar battery. Alternatively, a gel electrolyte can coat the separator. In still further alternatives, a gel electrolyte can coat the first metal layer and/or second metal layer before combination. In still further alternatives, the electrolyte can be blended with particles of cathode active material that makes up the cathode. In various embodiments, incorporating the electrolyte into the components of the bipolar batter can reduce degassing in the bipolar battery. In variations that include a flexible seal, the bipolar battery can accommodate gas resulting from degassing. Moreover, manufacture of the bipolar battery does not require a separate electrolyte fill step.

The seal material can be a polymer, an epoxy, or other suitable material that can bond with first and second metal layers to create a hermetic seal. In some embodiments, the polymer can be polypropylene (PP), polyethylene (PE), polyethylene terephthalate (PET), polytrimethylene terephthalate (PTT), polyimide (PI), or any other suitable polymer that can bond with the first and second metal layers of the bipolar plate to form a hermetic seal and can also provide resistance to moisture impedance.

As illustrated in FIG. 1, seals 140 can be formed on opposing sides (i.e. the top and bottom) of the bipolar plate 150. By way of explanation, for cell C2, the seals 140 are disposed between the second metal layer 154 in contact with the cathode 110 and the first metal layer 152 in contact with the anode 120.

The individual electrochemical cells may be formed in any suitable manner. In some embodiments, the cathode 110, the anode 120, and the separator 130 can be pre-assembled. Then a first metal layer 152 can be connected to the anode while a second metal layer 154 is connected to the cathode to create a cell. Then the seal material can be disposed between the first metal layer 152 and the second metal layer 154 to form seals 140.

Figure 3A:
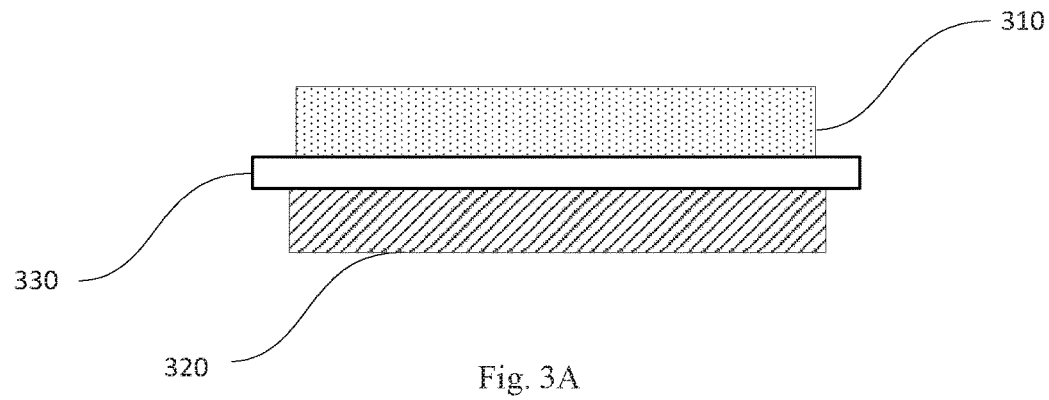
FIG. 3A depicts a cathode, an anode, and a separator assembly that can be formed to create an electrochemical cell of a bipolar battery in accordance with embodiments of the disclosure.
Figure 3B:
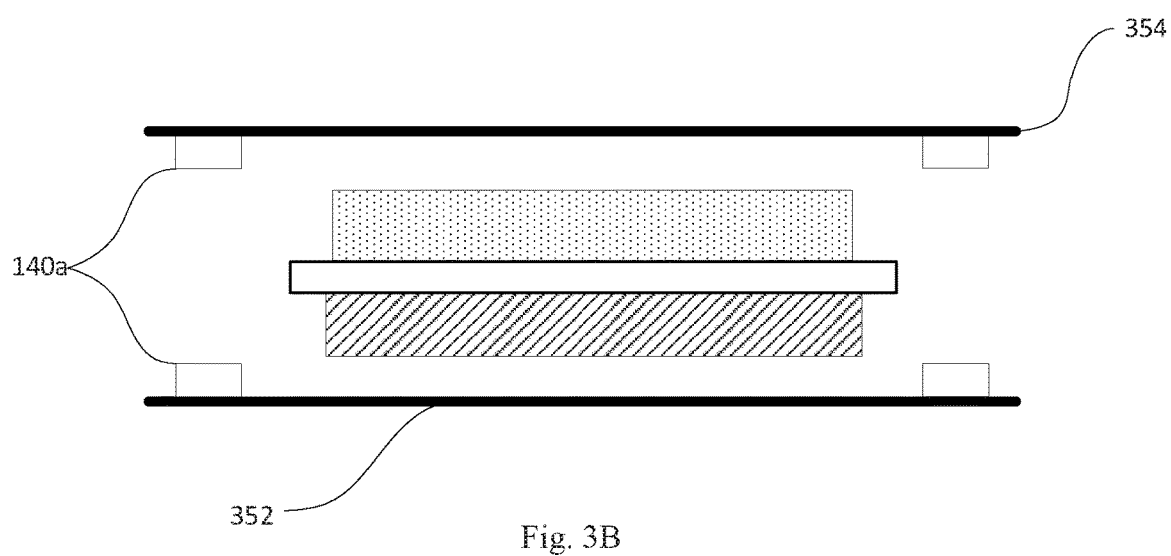
FIG. 3B depicts a first metal layer and a second metal layer being combined with the cathode, an anode, and separator assembly of FIG. 3A, in accordance with embodiments of the disclosure.
Figure 3C:
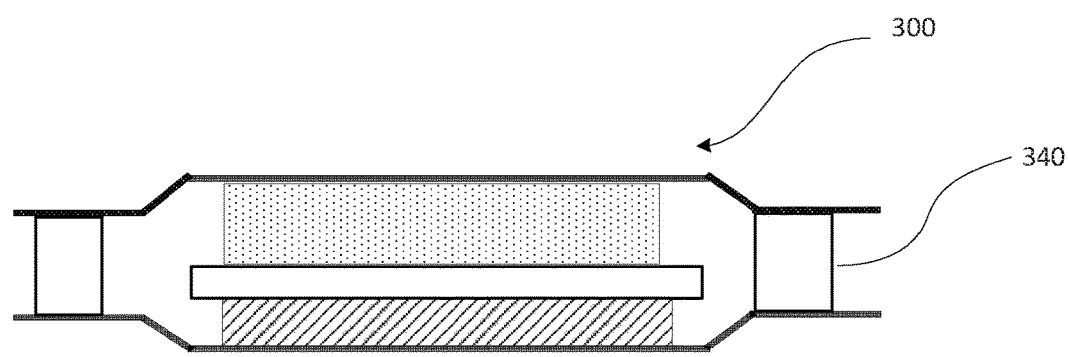
FIG. 3C depicts a single sealed electrochemical cell of a bipolar battery in accordance with embodiments of the disclosure.

In alternative embodiments, the metal layers can be pre-coated with the seal material. By way of illustration, assembly of an individual cell is depicted in FIGS. 3A-3C. As shown in FIGS. 3A-3C, the pre-coated seal material on the metal layers can be applied to the peripheral ends of the metal layers. As illustrated in FIG. 3A, a preformed cathode 310 and a preformed anode 320 can be laminated with the separator 330. As shown in FIG. 3B, the first and second metal layers 352 and 354 can be pre-coated with the seal material 140a. The pre-coated metal layers 352 and 354 can be joined with the cathode-separator-anode assembly such that the seal material 140a on the first metal layer 352 aligns with the seal material 140a on the second metal layer 354 to create an open cell assembly. Then in FIG. 3C, the seal material of 140a on the first and second layers 352 and 354 can be laminated to create a sealed single cell 300 with seal 340. In some embodiments, the pre-coated seal material can extend across a length of the metal layers such that when the cell is assembled the material is in contact with the peripheral ends of the separator 130 while a space is present between the seal 340 and the ends of the cathode and anode.

Figure 4A:
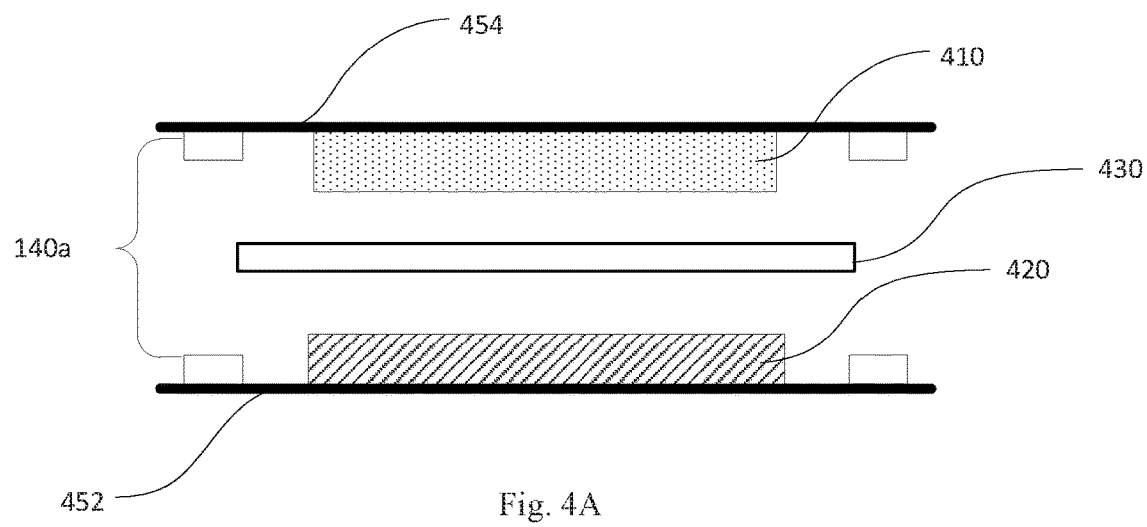
FIG. 4A depicts a first metal layer with an anode and a second metal layer with a cathode being combined with a separator, in accordance with embodiments of the disclosure.
Figure 4B:
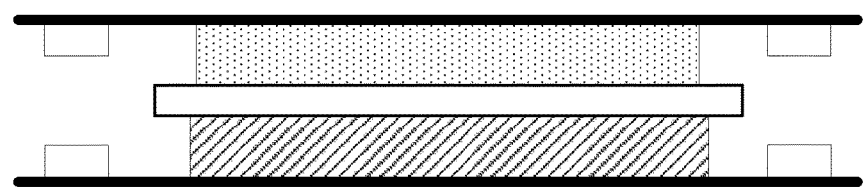
FIG. 4B depicts the first metal layer with an anode and a second metal layer with a cathode of FIG. 4A as assembled with a separator, in accordance with embodiments of the disclosure.
Figure 4C:
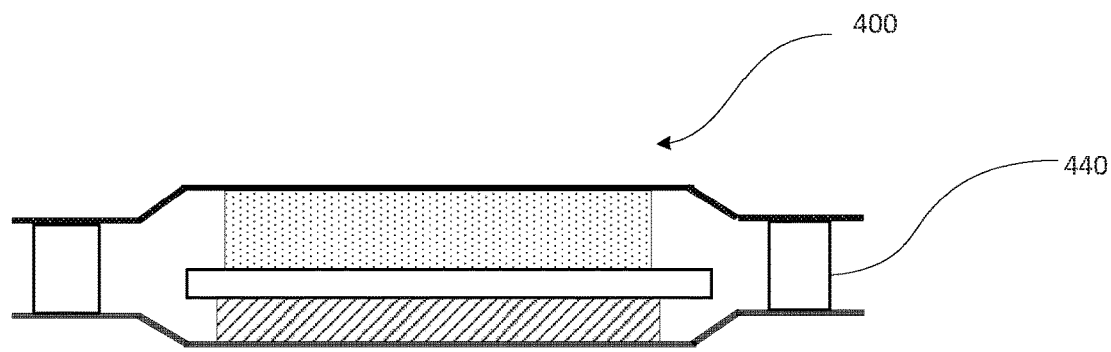
FIG. 4C depicts the first metal layer with an anode and a second metal layer with a cathode of and separator assembly of FIG. 4B being sealed to form an electrochemical cell, in accordance with embodiments of the disclosure.

In other embodiments, as shown in FIGS. 4A-4C, the metal layers can be pre-laminate with the cathode (or anode) and the seal material. Again by way of illustration, assembly of an individual cell is depicted in FIGS. 4A and 4B. As shown in FIG. 4A, an anode 420 along with seal material 140a can be laminated to a first metal layer 452. Also shown in FIG. 4A is a cathode 410 along with seal material 140a laminated to a second metal layer 454. As shown in FIG. 4B, the metal layers 452 and 454 pre-laminated with the anode 420 (or cathode 410) and the seal material 140a can be joined with the separator 430 to form an open cell assembly 400a. Again, the seal material 140a on the first metal layer 452 aligns with the seal material 140a on the second metal layer 454 to create the open cell assembly. Then in FIG. 4C, the seal material of 140a on the first and second layers 452 and 454 can be laminated to create a sealed cell 400.

Figure 5A:
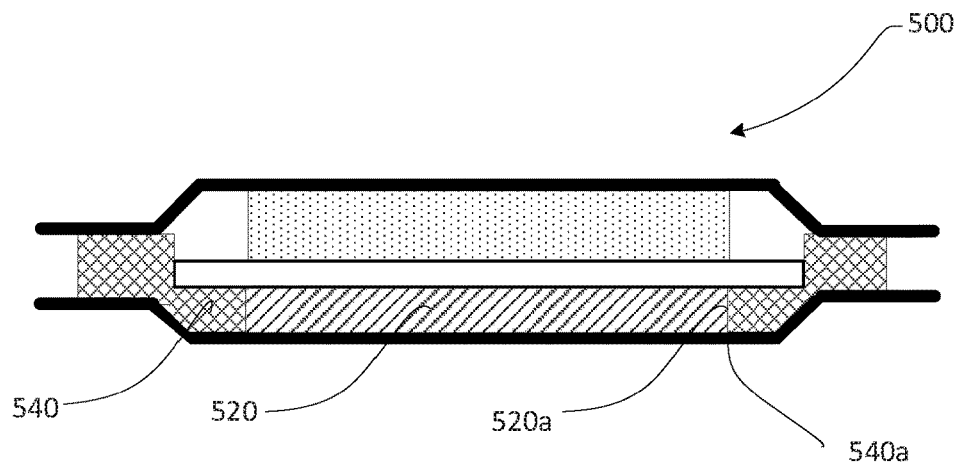
FIG. 5A depicts electrochemical cell with a seal that is in contact with the anode, in accordance with embodiments of the disclosure.

In some embodiments, the seal material can extend along a length of one or both metal layers so as to have an edge that is in contact with the anode or cathode. By way of illustration with an individual cell, FIG. 5A depicts cell 500. In cell 500, the seal 540 extends further along the length of first metal layer 554 so an edge 540a of the seal is in contact with an edge 520a of anode 520. This configuration can further enhance the hermeticity of the seals.

Figure 5B:
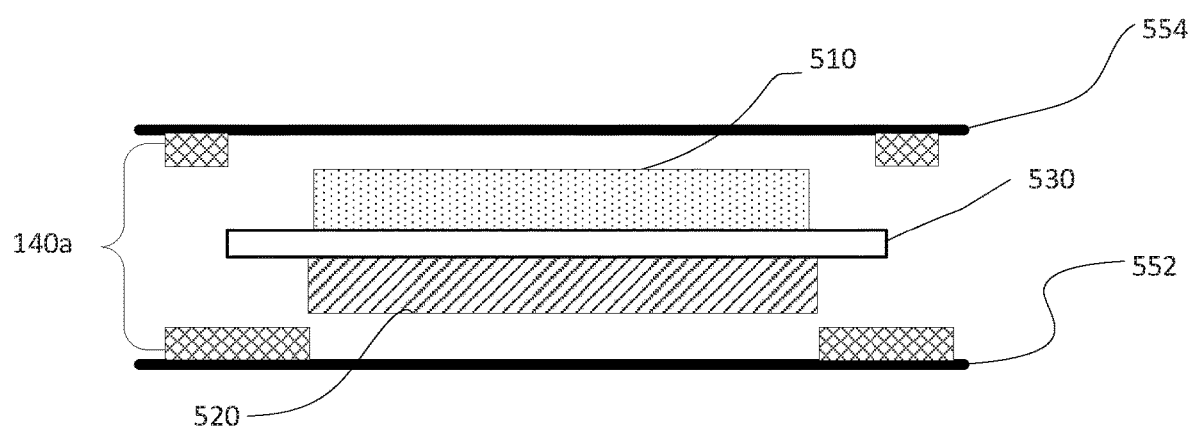
FIG. 5B depicts the electrochemical cell of FIG. 5A in a disassembled state illustrating the first metal layer, cathode, separator, anode, second metal layer, and seal material, in accordance with embodiments of the disclosure.
Figure 5C:
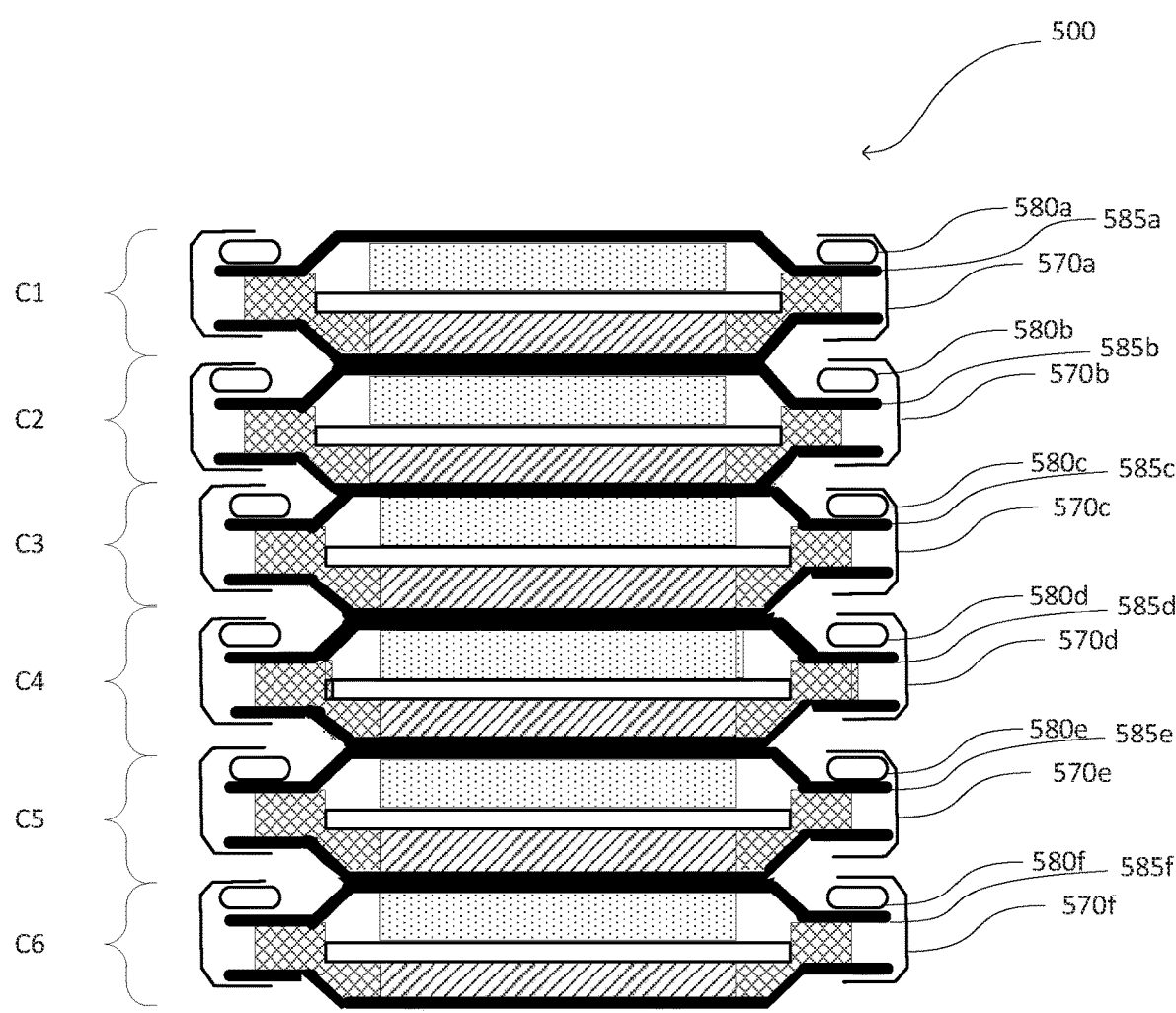
FIG. 5C depicts a schematic longitudinal sectional view of a bipolar battery comprising a stack of electrochemical cells as depicted in FIG. 5A, in accordance with embodiments the disclosure.

FIG. 5B depicts cell 500 in a disassembled state. As illustrated, the seal material on the first metal layer 554 extends a length longer than the seal material on the second metal layer 552 such that the seal 540 is in contact with the anode. In alternative embodiments, this can be revised. The seal material on the second metal layer can extend a length longer than the seal material on the first metal layer such that the seal is in contact with the cathode. In still other embodiments, the seal material on the first and second metal layers can extend to be in contact with both the anode and cathode. FIG. 5C depicts a stacked cell assembly 50 comprising a series of individual electrochemical cells C1, C2, C3, C4, C5, and C6.

In some embodiments, the peripheral ends of the sealed electrochemical cell can be further taped to frame the cell. As illustrated in FIG. 5C, the individual electrochemical cells C1, C2, C3, C4, C5, and C6 can be include tapes 570a, 570b, 570c, 570d, 570e, and 570f, respectively, disposed around the outer perimeter of the metal layers and seals. The tape can be substituted with ceramic or polymer materials. This can be done for a variety of reasons, such as to prevent shorting, to provide better electrochemical or chemical stability, and to provide mechanical strength.

With further reference to FIG. 5C, the sealed electrochemical cell can also include balancing circuits 580a, 580b, 580c, 580d, 580e, and 580f. The exposed first metal layer and second metal layer at the terminus of each cell can serve as a terminal. Balancing circuits 580a, 580b, 580c, 580d, 580e, and 580f are operably connected to second metal layers 585a, 585b, 585c, 585d, 585e, and 585f of cells C1, C2, C3, C4, C5, and C6, respectively. The balancing circuits 580a, 580b, 580c, 580d, 580e, and 580f are configured to measure and adjust the voltage of each of cells C1, C2, C3, C4, C5, and C6. Cells C1, C2, C3, C4, C5, and C6 can thereby operate at the same voltage, or within a given range of voltages.

By balancing each cell, each cell controls the amount of lithium transmission at a given amount or within a range of energy production, thereby reducing the likelihood of damaging one or more cells.

Figure 6:
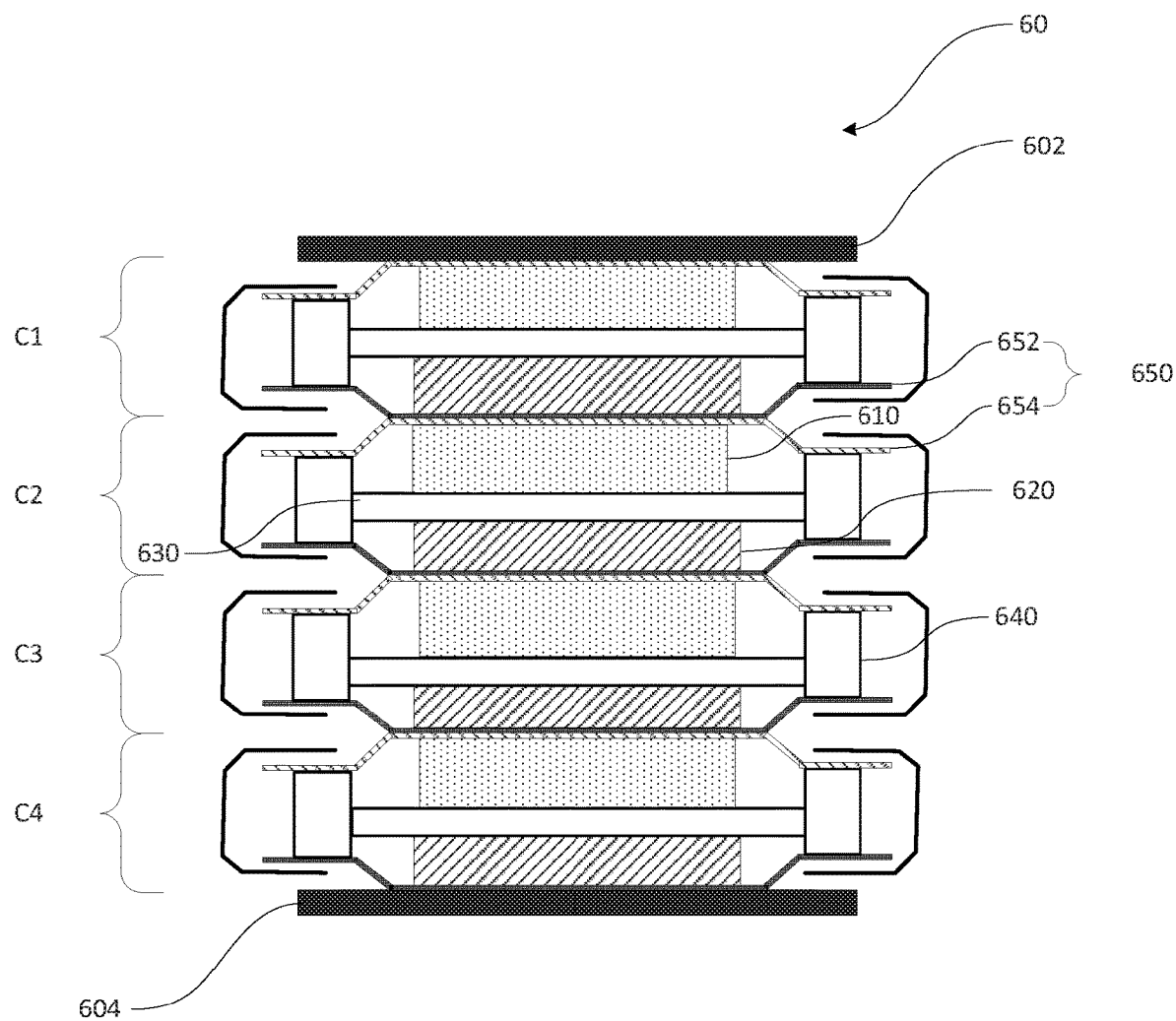
FIG. 6 depicts a schematic longitudinal sectional view of another bipolar battery, in accordance with embodiments the disclosure.

Also, in some embodiments as illustrated in FIG. 6, rather than the seal extending to be in contact with the anode and/or cathode, the separator is longer in length than the anode and cathode such that the peripheral ends of the separator are in contact with the seal.

In some embodiments, the bipolar plate(s) (sometimes also referred to as bipolar foils) that extend beyond the seal region can be used for cell balancing, thermal management, or potentially other functions. A small electrically-conductive region or path is sufficient, such that the full perimeter of the cell is not needed. This is typically described as a "feedthrough" or tab. In some instances, a cell may have a single electrically-conductive feedthrough per cathode-anode pair. These feedthroughs may be physically separated with sufficient distance to prevent shorting or arcing between them. When viewing the cell stack from the top, this can be accomplished by spacing the feedthrough tabs along the perimeter of the cell. For example, if viewing the cell from the top, the feedthrough tabs might correspond to the hour markers on a clock, where one tab occurs at the 12:00 position, another at the 2:00 position, and so forth. To minimize wasted volume in the pack, the feedthrough tabs may be positioned on one side of the cell stacks.

In still other embodiments, the bipolar battery can include a multi-seal configuration with one seal that provides electrochemical isolation between the electrochemical cells and a second seal that is an elastomer to provide flexibility to accommodate expansion in the z-direction (e.g., the direction along which the individual electrochemical cells are stacked). A bipolar battery with a multi-seal configuration can include a plurality of electrochemical cells, each cell having a cathode, a separator, and an anode. In various embodiments, plates can be disposed between adjacent electrochemical cells. The bipolar plates include a first metal layer and a second metal layer. To electrochemically isolate the stacked electrochemical cells of the battery, a plurality of hermetic seals can be employed, where each hermetic seal is disposed between a peripheral end of a second metal layer of a first bipolar plate and a peripheral end of a first metal layer of a second adjacent bipolar plate. The battery also includes a plurality of flexible seals to add further flexibility to the battery to accommodate expansion in the z-direction. Each flexible seal is disposed in the gap between the peripheral ends of the first and second metal layers.

Figure 7:
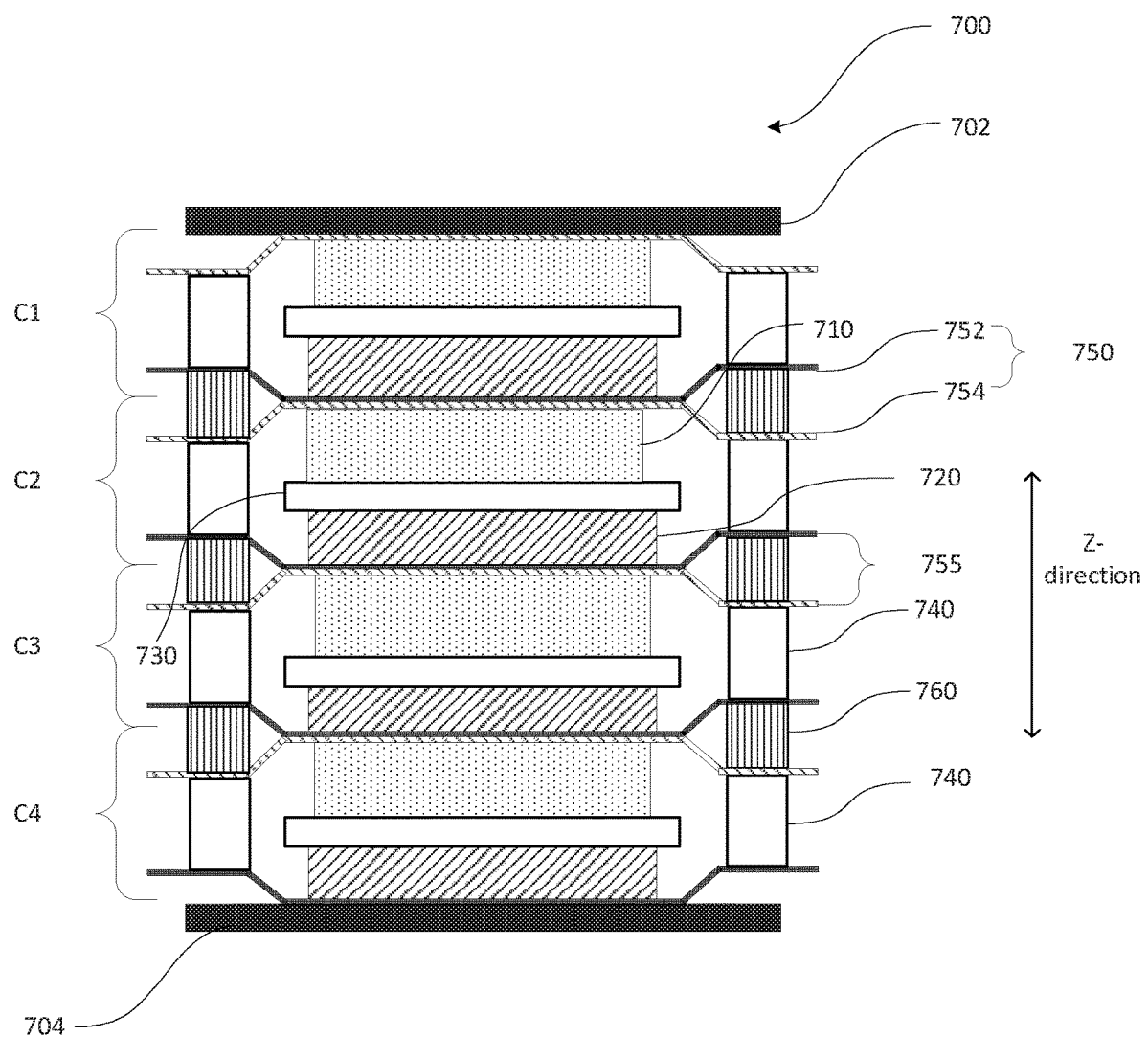
FIG. 7 depicts a schematic longitudinal sectional view of another bipolar battery having electrochemical seals and flexible seals, in accordance with embodiments the disclosure.

An example bipolar battery 700 with a multi-seal configuration is depicted in FIG. 7. As illustrated, the bipolar battery 700 comprises a stack of electrochemical cells C1, C2, C3, and C4 between end plates 702 and 704. Similar to the batteries illustrated in the other embodiments, end plates 702 and 704 can be metal current collector plates, which serve both electrical and mechanical functions. In some embodiments, end plates 702 and 704 can be support plates that form part of an external housing of the bipolar battery. In some embodiments, end plates 702 and 704 may provide mechanical support within a housing of the bipolar battery. In some embodiments, some or all of the support plates may be electrically conductive (e.g., there may be a terminal within the support plate that is electrically connected to the end plate). In some embodiments, end plates 702 and 704 can act as positive and negative terminals of the battery.

Again, the stack of electrochemical cells in bipolar battery 700 can include any number of electrochemical cells depending on the selected voltage output for the battery 700. The cell stack can be arranged with as many or as few electrochemical cells in series as desired.

Each cell C can include a cathode 710 and an anode 720, where the cathode 710 and anode 720 are separator by separator 730 between the cathode and anode. Between the anode 720 of C1 and the cathode of adjacent cell C2 is a bipolar plate 750. By way of illustration, in some embodiments, a first cell C1 and a second cell C2 are connected by a bipolar plate 750 between C1 and C2.

The bipolar plate 750 comprises a first metal layer 752 and a second metal layer 754. The first metal layer 752 and second metal layer 754 can any metal layers as described in the previous embodiments.

Again, as shown in FIG. 7, the bipolar plate 750 has a connection region where the first metal layer 752 and second metal layer 154 are connected, and a gap region at the peripheral ends of the bipolar plate 750. The connection region and gap region are as described in FIG. 2A. In the connection region 753, the first metal layer and second metal layer are joined to be electrically-conductive. In some embodiments, the first metal layer and second metal layer can be directly connected, while in other embodiments the first metal layer and second metal layer can be indirectly connected via a conductive material. To form the connection region 753, the first metal layer 752 and the second metal layer 754 can be laminated together, welded, affixed with an electrically conductive adhesive, wetted, or physically bonded by stacking, as described in the previous embodiments.

Similar to the above described embodiments, there is a gap region 755 between the first and second metal layers 752 and 754 of the bipolar plate 750. In the gap region 755, the peripheral ends of the first metal layer 752 and the second layer 754 are spaced apart and moveable relative to each other. As such, there is a separation distance between the first and second metal layers, which can increase as the electrochemical cell swells. As such, there is a separation distance between the first and second metal layers over a length L that can create a gap or space in which the flexible seal 760 can be located. The flexible seal 760 can moveably connect the peripheral ends of the first metal layer 752 and the second layer 754 such that the separation distance can increase as the electrochemical cell swells during cycling. Again, the length L can be selected to accommodate the expansion of the cell in the z-direction due to swelling during cycling of the battery. The separation distance between the first and second metal layers is larger in the gap region 755 than the connection region 753.

As shown in FIG. 7, each cell C1, C2, C3, and C4 also includes electrochemical seals 740 that electrochemically isolate the electrochemical cells from each other. Thus, each cathode-anode pair is electrochemically sealed and isolated from neighboring electrochemical cells. Because the metal layers 752 and 754 are separated at the peripheral ends, seals 740 can be formed on opposing sides (i.e. the top and bottom) of the bipolar plate 750.

Electrochemical seals 740 are similar to the seals described in the above embodiments. In various embodiments, the electrochemical seal material can bond with the first and second metal layers of the bipolar plate to prevent electrolyte leakage. The electrolyte can be a solid, a gel, or a liquid. Ions in the electrolyte of a cell can escape and pass to a neighboring cell. The seals can electrochemically isolate each cell by hermetically sealing the cell. The seal material can be any material (e.g. polymers or epoxies) that bonds well with the metal layers such that the hermetic seal can be maintained through the life the battery. For example, in some embodiments, the hermeticity of the seal can be maintained for at least 10 years. In other embodiments, the hermeticity of the seal can be maintained for at least 15 years.

Bipolar battery 700 also includes flexible seals 760. As shown in FIG. 7, flexible seals 760 are positioned in the gap region 755 between the peripheral ends of the first metal layer 752 and second metal layer 754 of the bipolar plate 750. The flexible seal 760 can comprise an elastomeric material. The elastomer of the flexible seal provides mechanical strength while having an elasticity that can accommodate expansion in the z-direction of the cell. The flexible seal can comprise any suitable elastomeric material. In some embodiments, the elastomer can be a silicon-based material, a rubber, such as a polyethylene, ethylene propylene diene monomer (EPDM), or other elastomer material that is compatible to electrolyte (i.e. stable at the selected voltage), stable in temperatures of 150° C. or less, and has good dielectric properties (i.e. resistance less than $10^{12}$ Ohm/cm).

Again, the cell stack of battery 700 can be arranged in as many or as few electrochemical cells in series as desired, depending on the selected energy capacity of the battery for the intended purpose.

Figure 8:
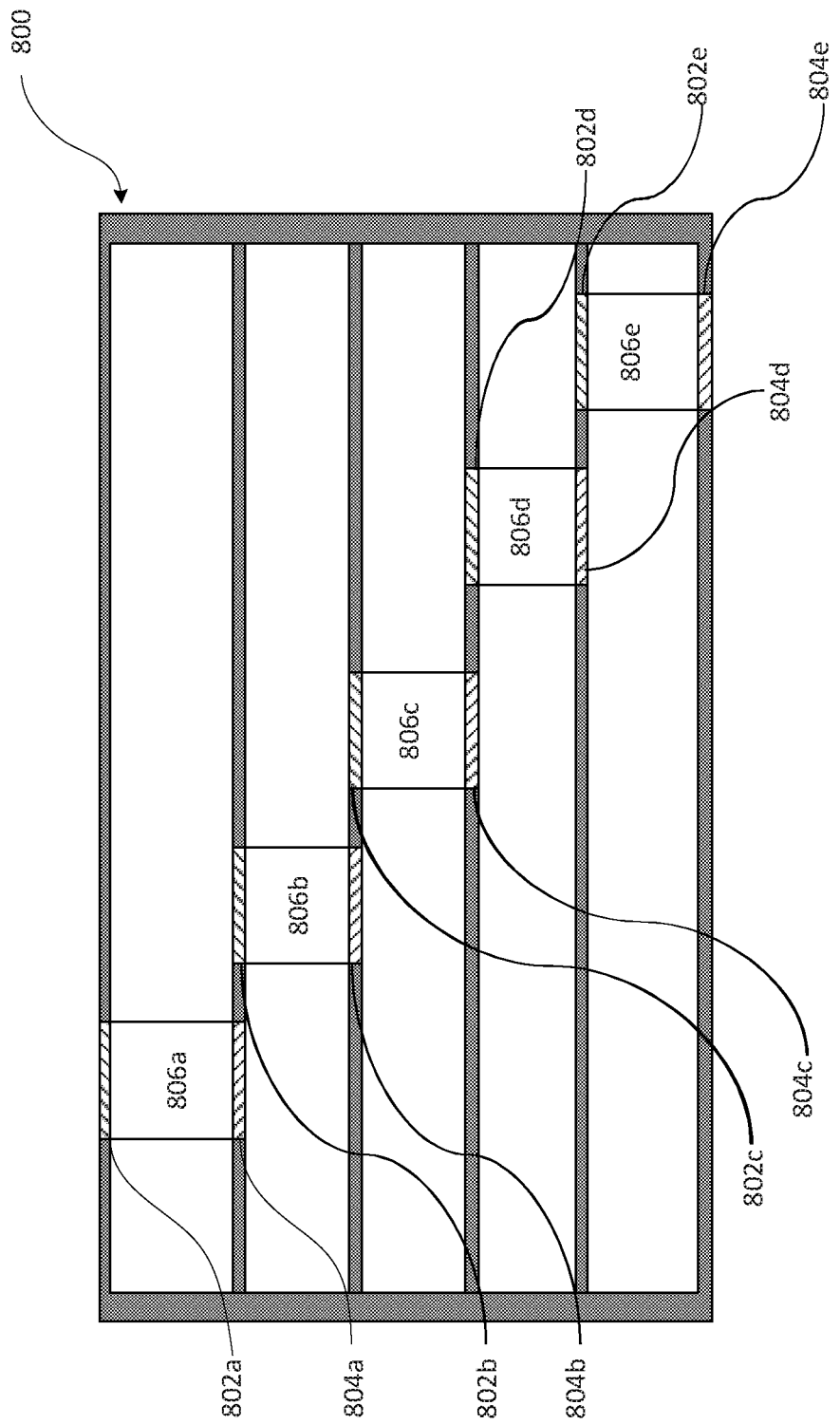
FIG. 8 depicts a lateral view of a bipolar battery, showing the position of the first and second metal layers on the lateral end of the bipolar battery, in accordance with embodiments the disclosure.

In various aspects, the first and second metal layers can be displaced along the Z-direction. FIG. 8 depicts a lateral view of bipolar battery 800, showing the position of the first and second metal layers on the lateral end of the bipolar battery. First metal layers 802a, 802b, 802c, 802d, and 802e associated with the cathode are separated from second metal layers 804a, 804b, 804c, 804d, and 804e associated with the anode by flexible seals 806a, 806b, 806c, 806d, and 806e. Cathode metal layers 802a, 802b, 802c, 802d, and 802e and anode metal layers 804a, 804b, 804c, 804d, and 804e serve as electrical contacts for the bipolar battery. The cathode and anode form cathode-anode pairs displaced one from the other as depicted in the lateral view. By displacing the cathode and anode pairs, each cathode and anode in the bipolar battery is more accessible to electronic components outside the battery.

Figure 9:
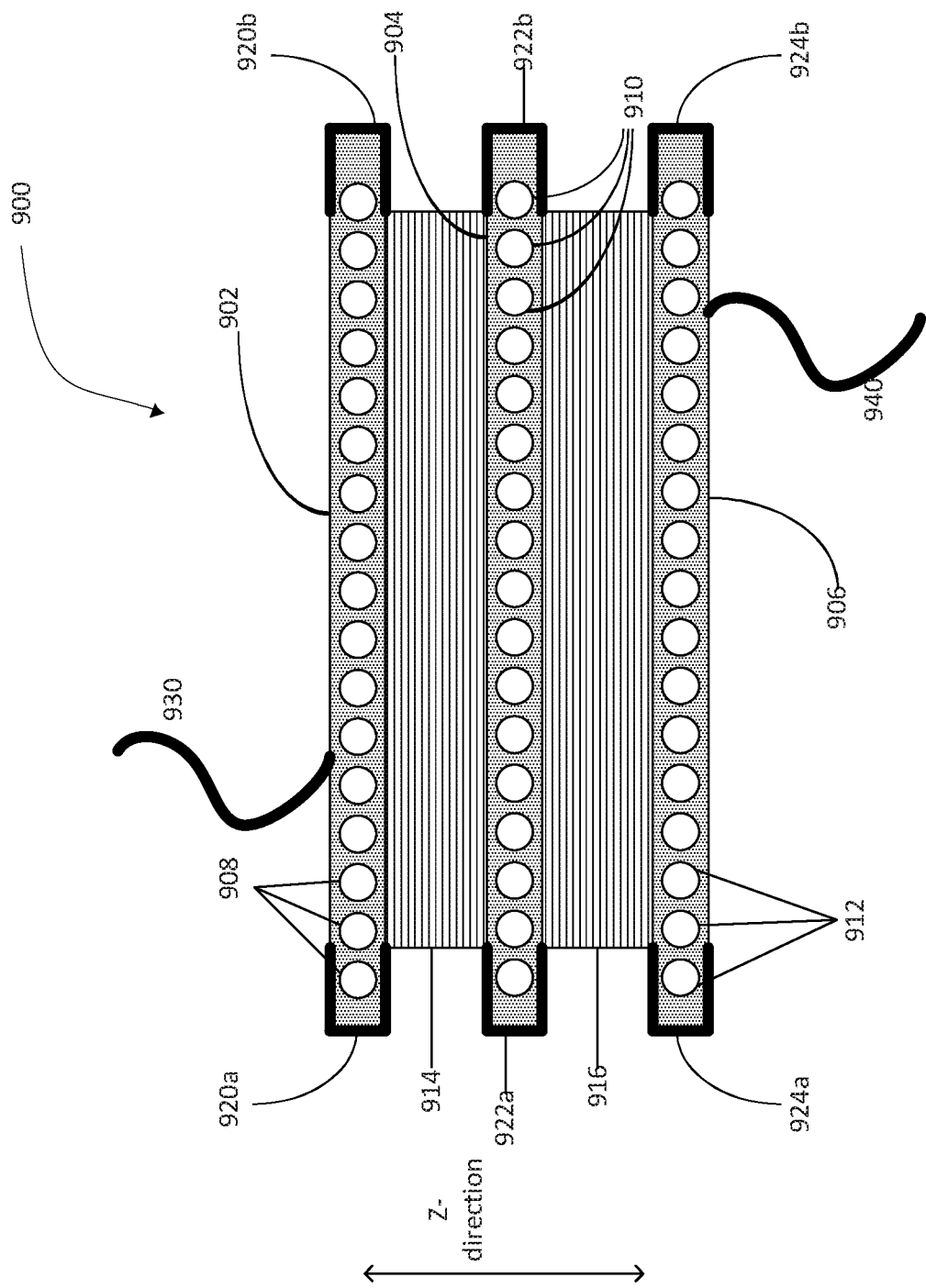
FIG. 9 depicts a lateral view of cooling plates bordering multiple battery stacks, in accordance with embodiments the disclosure.

In various aspects, the bipolar batteries can include plates that cool the bipolar battery. FIG. 9 depicts bipolar battery 900 having plates 902, 904, and 906. Plates 902 and 904 border battery stack 914. Plates 904 and 906 border battery stack 916. Each of plates 902, 904, and 906 has a plurality of fluidly conductive holes 908, 910, and 912, respectively. Fluidly conductive holes 908, 910, and 912 can be used to conduct cooling fluid, whether liquid or gas, that can thermally cool plates 902, 904, and 906, thereby removing heat from and cooling a bipolar cell.

In various aspects, end plates of the bipolar cells can be both electrically and thermally conductive. Suitable materials include, but are not limited to, aluminum, aluminum alloys, iron alloys, etc.

Leads conducting electric power from the bipolar cell can be disposed at any location on each endplate. Referring again to FIG. 9, positive lead 930 and negative lead 940 are positioned at different locations relative to the Z-direction of the electrode stack.

The gap regions (i.e., end regions) of the bipolar cell end plates can be electrically insulated such that they do not create an electrical connection laterally in the x-axis or y-axis. Referring again to FIG. 9, the terminal ends of plates 902, 904, and 906 can be electrically insulated with electrically insulating material. The terminal end of plate 902 is insulated with electrically insulating material 920a and 920b. The terminal end of plate 904 is insulated with electrically insulating material 922a and 922b. The terminal end of plate 906 is insulated with electrically insulating material 924a and 924b. The material can be any electrically insulating material, including but not limited to, insulating tape, glue, polymer, and combinations thereof.

Figure 10:
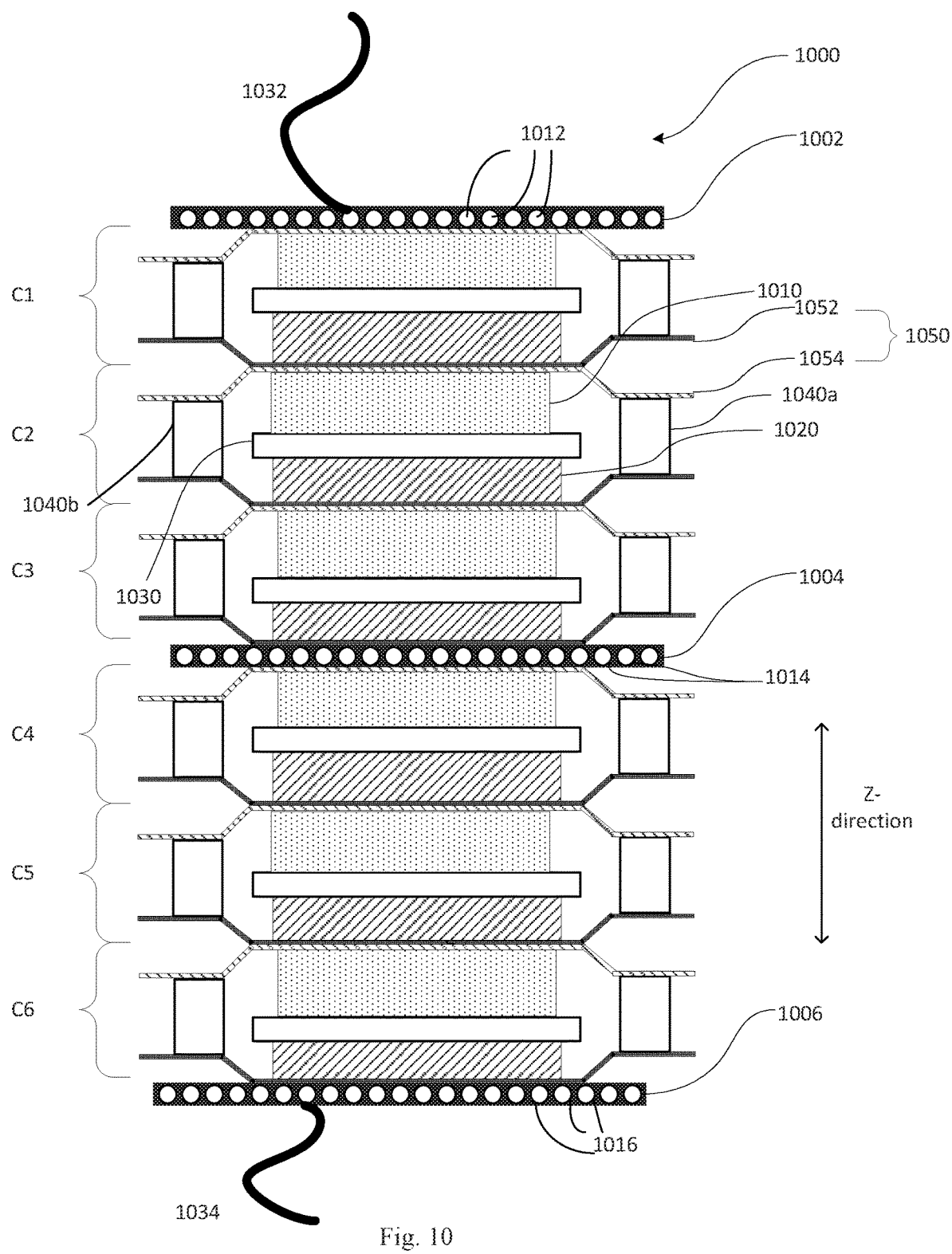
FIG. 10 depicts a schematic longitudinal sectional view of another embodiment of a bipolar battery showing multiple endplates, in accordance with embodiments the disclosure.

FIG. 10 depicts a schematic longitudinal sectional view of another embodiment of a bipolar battery showing multiple endplates. Bipolar battery 1000 includes a stack of electrochemical cells C1, C2, and C3 between end plates 1002 and 1004, and a stack of electrochemical cells C4, C5, and C6 between end plates 1004 and 1006. Similar the batteries illustrated in the other embodiments, end plates 1002, 1004, and 1006 can be metal current collector plates, which serve both electrical and mechanical functions. The end plates can, for example, be laminated to the adjacent cells.

In a similar manner to batteries illustrated in other embodiments, end plates 1002, 1004, and 1006 can be support plates that form part of an external housing of the bipolar battery. In some embodiments, end plates 1002, 1004, and 1006 may provide mechanical support within a housing of the bipolar battery. In some embodiments, some or all of the support plates may be electrically conductive (e.g., there may be a terminal within the support plate that is electrically connected to the end plate). In some embodiments, end plates 1002, 1004, and 1006 can act as positive and negative terminals of the battery. Likewise, end plates 1002, 1004, and 1006 have a series of holes through which coolant can flow.

Electrochemical cells C1, C2, and C3 form a stack between bipolar endplates 1002 and 1004. Likewise, electrochemical cells C4, C5, and C6 form a stack between bipolar endplates 1004 and 1006. Though depicted with three cell stacks, between each of bipolar endplates 1002 and 1004, and three cell stacks between endplates 1004 and 1006, the cell stack can include as many or as few electrochemical cells in series as desired. As described in other aspects herein, the end plates can be constructed of any material that is both electrically and thermally conductive.

As illustrated by example cell C2, each cell C can include a cathode 1010 and an anode 1020 separated by separator 1030. Between the anode 1020 of C1 and the cathode of adjacent cell C2 is a bipolar plate 1050. The bipolar plate 1050 comprises a first metal layer 1052 and a second metal layer 1054. The first metal layer 1052 and second metal layer 1054 can be any metal as described in the various embodiments herein.

By way of illustration, in some embodiments, a first cell C1 and a second cell C2 are connected by a bipolar plate 1050 between C1 and C2. It will be noted that the bipolar plate can be substituted by other structures referred to herein.

In various aspects, each end plate 1002, 1004, and 1006 is thermally conductive. Further, each end plate 1002, 1004, and 1006 includes holes 1012, 1014, and 1016 through which a fluid, such as a liquid coolant or gaseous coolant, can flow. It will be recognized that not all endplates need have such holes. In various embodiments, one or more endplates can have holes to transport fluid. In other embodiments, none of the plates have such holes.

Figure 11:
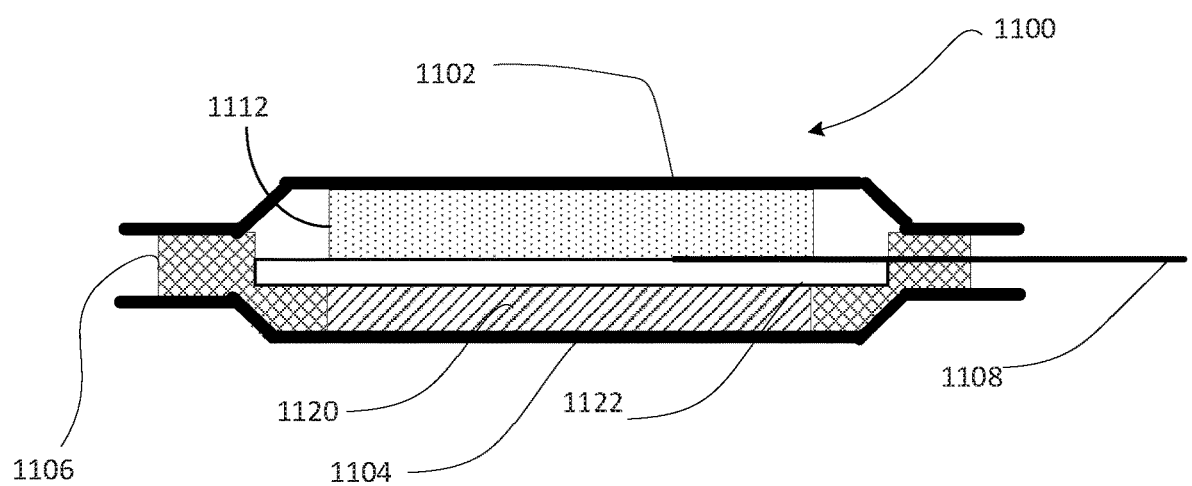
FIG. 11 depicts a longitudinal sectional view of a battery cell including a reference electrode, in accordance with embodiments the disclosure.

Like other embodiments herein, electric leads conducting electric power from the bipolar cell can be disposed at any location on each endplate. Referring again to FIG. 10, positive lead 1030 and negative lead 1032 are positioned at different locations relative to the Z-direction of the electrode stack. Positive lead 1030 and negative lead 1032 can be positioned at any location along the end plate. Electrochemical seals 1040a and 1040b, as illustrated for cell C2, can be similar to the seals described in the various embodiments. The bipolar plate 1050 includes a first metal layer 1052 and a second metal layer 1054. The first metal layer 1052 and second metal layer 1054 can any metal as described in the various embodiments herein. Again, the cell stack of battery 1000 can be arranged in as many or as few electrochemical cells in series as desired depending on the selected energy capacity of the battery for the intended purpose. The voltage of individual cells can be monitored or controlled. Cells can also include a reference electrode that can be configured for balancing the cell. FIG. 11 depicts a longitudinal sectional view of battery cell 1100 including reference electrode 1108. The terminus includes first metal layer 1102 and second metal layer 1104 separated by seal 1106. Reference electrode 1108 is disposed between cathode 1112 and separator 1114, and protrudes from the terminus of battery cell 1100. In various embodiments, reference electrode 1108 can be used in conjunction with balancing circuit 1110 to balance the voltage of the cell. It will be appreciated that not every cell must have a reference electrode; one more cells can include a reference electrode.

Bipolar cells as described herein allow lateral heat dissipation of heat along the first metal layer and second metal layer in the lateral direction normal to the Z-direction. Heat dissipation is thus normal to the direction of lithium ion and electron transport. With more uniform heating across the full electrode, there is an improved ability to conduct heat to the surrounding structure. Bipolar cells have increased reliability due to higher heat conductivity away from the direction of ion flow.

Figure 12:
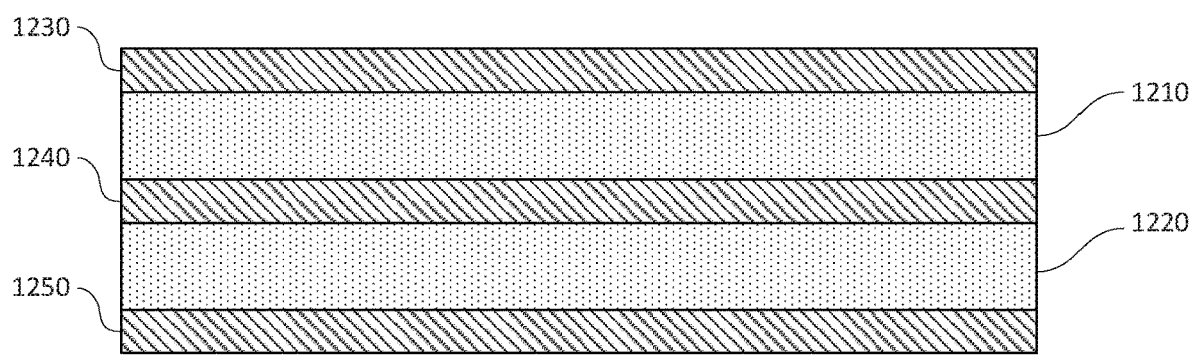
FIG. 12 depicts thermally sensitive layers disposed on a first metal layer and a second metal layer, in accordance with embodiments the disclosure.

In various aspects, battery cells can include thermally sensitive layers that, when activated, inhibit, reduce, or prevent heat transfer in the Z-direction. FIG. 12 depicts first metal layer 1210 and second metal layer 1220. Thermally sensitive layer 1230 is disposed on first metal layer 1210 on the opposite side from second metal layer 1220. Thermally sensitive layer 1240 is disposed between first metal layer 1210 and second metal layer 1220. Thermally sensitive layer 1250 is disposed on second metal layer 1220 on the opposite side from first metal layer 1210. It will be appreciated that only one of thermally sensitive layers 1230, 1240 and 1250 need be disposed on the sample.

Below a threshold temperature, thermally sensitive layers 1230, 1240, and 1250 are porous to lithium ions. When activated at a threshold temperature, the thermally sensitive layer ceases to be porous to lithium ions, thereby inhibiting, reducing, and/or preventing ion conductivity between first metal layer 1210 and second metal layer 1220.

Thermally sensitive layers 1230, 1240, and 1250 can be formed of one or more porous materials that enable ion transport there-through during battery operation. Thermally sensitive layers 1230, 1240, and 1250 can be disposed on surfaces by any method known in the art, including lamination, deposition methods, and the like.

Chemical reactions within a battery cell can generate heat. Moreover, a rate of ion transport during charging and discharging of an electrochemical cell can influence a rate of heat generation within a battery. Thermally sensitive layers 1230, 1240, and 1250 cease to be porous when they reach or exceed a threshold temperature, such as a critical operating temperature. When activated, materials of thermally sensitive layers 1230, 1240, and 1250 can exhibit a high resistance to ion transport, thereby inhibiting, reducing, and/or preventing operation of the battery when the temperature of the battery rises above a threshold temperature.

In various embodiments, the thermally sensitive layer is a positive thermal coefficient (PTC) material in which resistance increases with temperature. The thermally sensitive layer activates at a temperature, such as between 100° C. and 120° C. In PTC materials, resistance increases as a function of temperature. Heat flow into adjacent cells is thereby inhibited such that a localized temperature does not induce thermal runaway. The resistance of the PTC layer thereby stops electrical flow in the battery.

Table 1 depicts several examples of thermally sensitive layer materials. It will be recognized that in embodiments where multiple thermally sensitive layers are used, the thermally sensitive layers can be the same or different at any location.

TABLE 1

| Material | Melting Temperature | Shutdown Range |
|---|---|---|
| Polyethylene (Low Density) | 163° C. | 120-220° C. |
| Polypropylene (Low Density) | 177° C. | 140-250° C. |
| Polyethylene (High Density) | 204° C. | 150-250° C. |
| Polymethyl methacrylate | 218° C. | 150-250° C. |
| Polyethylene terephthalate | 260° C. | 150-300° C. |
| Polybutylene terephthalate | 260° C. | 200-300° C. |
| Polytetrafluoroethylene | 316° C. | 250-370° C. |
| Polyamide-imide | 343° C. | 250-450° C. |
| Polyetherimide | 371° C. | 250-450° C. |

Without wishing to be held to any mechanism or mode of action, the thermally sensitive layer can be made of any material that melts at a specific temperature. Upon melting of the thermally sensitive layer, pores in the thermally sensitive layers are no longer present. As such, lithium ion transport ceases at a temperature within the "shutdown range" of temperatures for a given material.

Thermally sensitive layers 1230, 1240, and 1250 can be made from any material that allows ion and electron transport at a certain temperature, and then melt. After melting, the materials no longer allow lithium ion transport within a "shutdown" range.

Figure 13:
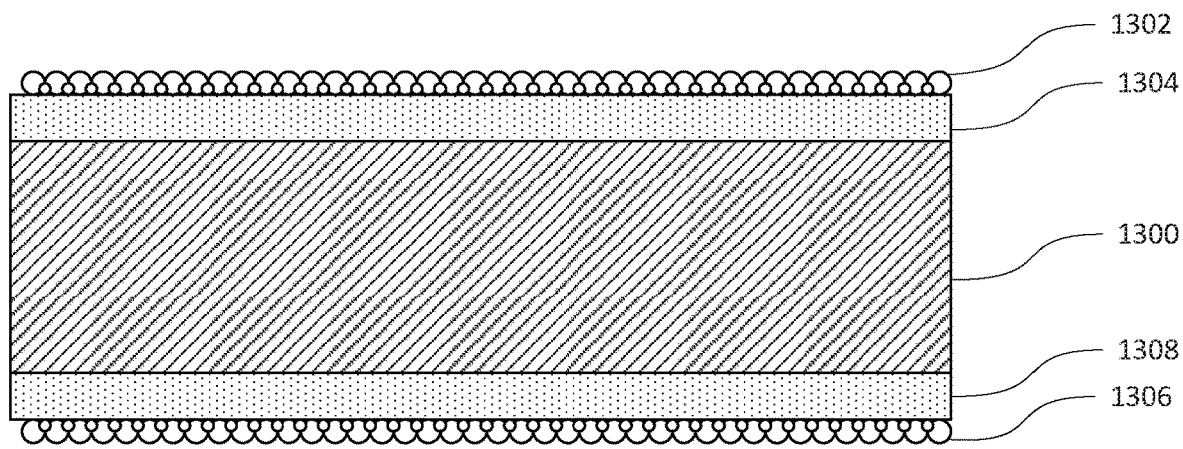
FIG. 13 depicts a thermally sensitive layer disposed on each surface of a separator and a bimodal ceramic disposed on each surface of the thermally sensitive layers, in accordance with embodiments the disclosure.

Battery cells in bipolar batteries can include ion path shutdown components disposed on other portions of the battery cell. With reference to FIG. 13, thermally sensitive layer 1304 is disposed on separator 1300. Ceramic layer 1302 is disposed on thermally sensitive layer 1304. Likewise, thermally sensitive layer 1308 is disposed on separator 1300 opposite thermally sensitive layer 1304. Ceramic layer 1306 is disposed on thermally sensitive layer 1308.

It will be recognized that in various embodiments ceramic layer 1302 can be disposed on a separator without thermally sensitive layer 1304, and that thermally sensitive layer 1304 can be disposed on separator 1300 without ceramic layer 1302. Further, ceramic layer 1302 can be disposed on separator 1300, and thermally sensitive layer 1304 can be disposed on ceramic layer 1302. Likewise, in various embodiments ceramic layer 1306 can be disposed on a separator without thermally sensitive layer 1308, and that thermally sensitive layer 1308 can be disposed on separator 1300 without ceramic layer 1306. In addition, ceramic layer 1306 can be disposed on separator 1300, and thermally sensitive layer 1304 can be disposed on ceramic layer 1302.

Thermally sensitive layer 1304 can have the same composition and properties as the as the thermally sensitive layers 1230, 1240, and 1250 described in FIG. 12. In various embodiments, thermally sensitive layer 1304 can be a positive thermal coefficient (PTC) material in which resistance increases with temperature. In various embodiments, thermally sensitive layer 1304 can have the composition of compounds described in Table 1.

Returning again to FIG. 13, ceramic layer 1304 is formed of a ceramic having at least two different particle sizes. The particle sizes allow greater coverage of the separator, with larger sized ceramic particles providing rigidity and smaller sized ceramic particles fitting there-between. The ceramic layer can be formed of any ceramic known in the art. During operation, heat generated from the battery can increase the temperature of a battery cell and melt the separator 1300. In such an event, the cathode and anode (not shown) can be physically connected.

In certain variations, it will be recognized that ceramic layer 1302 can be made of particles having the same size or different sizes. As depicted in FIG. 13, the ceramic is a bimodal ceramic that includes two different sizes of ceramic particles. The surface area of the separator is more concentrated.

In one aspect, ceramic layer 1302 can improve shrink resistance of separator 1300, making it more rigid and/or more stable in the Z-direction. In various aspects, the increase in mechanical strength of the separator 1300 and ceramic layer 1302 can help maintain mechanical strength on the sides of separator 1300 along the Z-direction. In various aspects, mechanical rigidity can be increased and/or maintained at higher temperatures in cases where the separator melts or would otherwise allow contact between the cathode and anode. The mechanical rigidity helps reduce the likelihood of an electrical short, as well as thermal runaway.

It will be recognized that in various embodiments ceramic layer 1302 can be included with the separator alone, or in combination with, the thermally sensitive layer 1304. The combination of ceramic layer and thermally sensitive layer 1304 on the separator provides additional protection against thermal runaway. Upon a localized heating event, ceramic 1302 helps maintain structural integrity of separator 1300. In addition, thermally sensitive layer 1304 when activated can inhibit or prevent thermal runaway.

Figure 14:
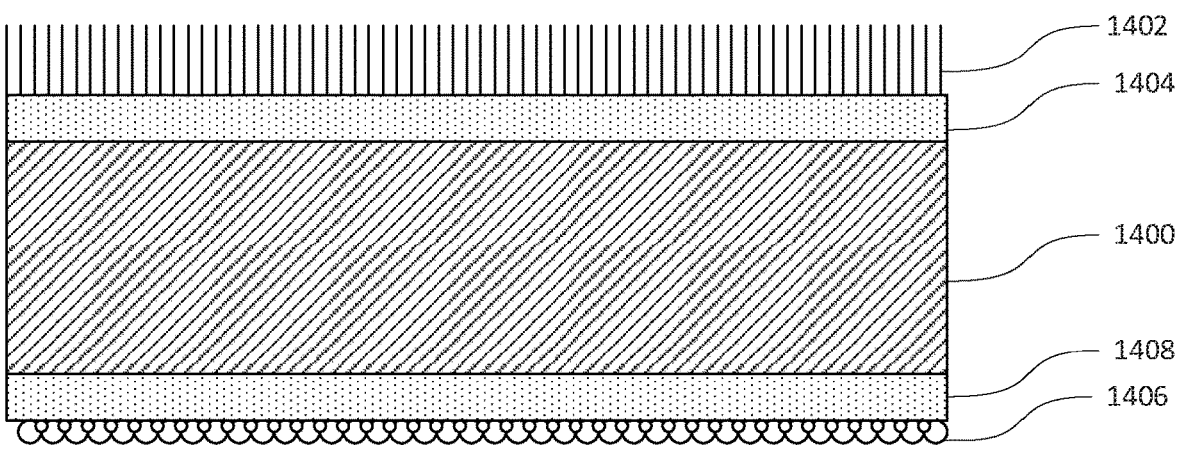
FIG. 14 depicts a thermally sensitive layer disposed on one surface of a separator and a bimodal ceramic disposed on the surface of the thermally sensitive layer, along with an anodized aluminum oxide layer disposed on the opposite surface of the separator, in accordance with embodiments the disclosure.

As another alternative, anodized aluminum oxide can be placed on the surface of the separator. With reference to FIG. 14, anodized aluminum oxide layer 1402 is placed on separator 1400. Thermally sensitive layer 1404 is disposed on the opposite side of separator 1400. Ceramic layer 1406 is disposed on thermally sensitive layer 1404.

Ceramic layer 1402 and the thermally sensitive layer 1404 can have the variations and compositions described in FIG. 13. Turning again to FIG. 14, the anodized aluminum oxide layer 1402 can provide another manner to shut down ion flow when temperature increases. Upon heating, anodized aluminum oxide layer 1402 can inhibit, reduce, or prevent ion transmission from the separator. Further, the anodized aluminum oxide layer 1402 can provide the same benefits as ceramic layer 1406 by maintaining structural rigidity and reducing the shrinkage of the alloy. In addition, the presence of anodized aluminum oxide layer 1402 can suppress formation of dendrites from separator 1400. In certain variations, an anodized aluminum oxide layer can be disposed on one or both sides of the separator.

Figure 15:
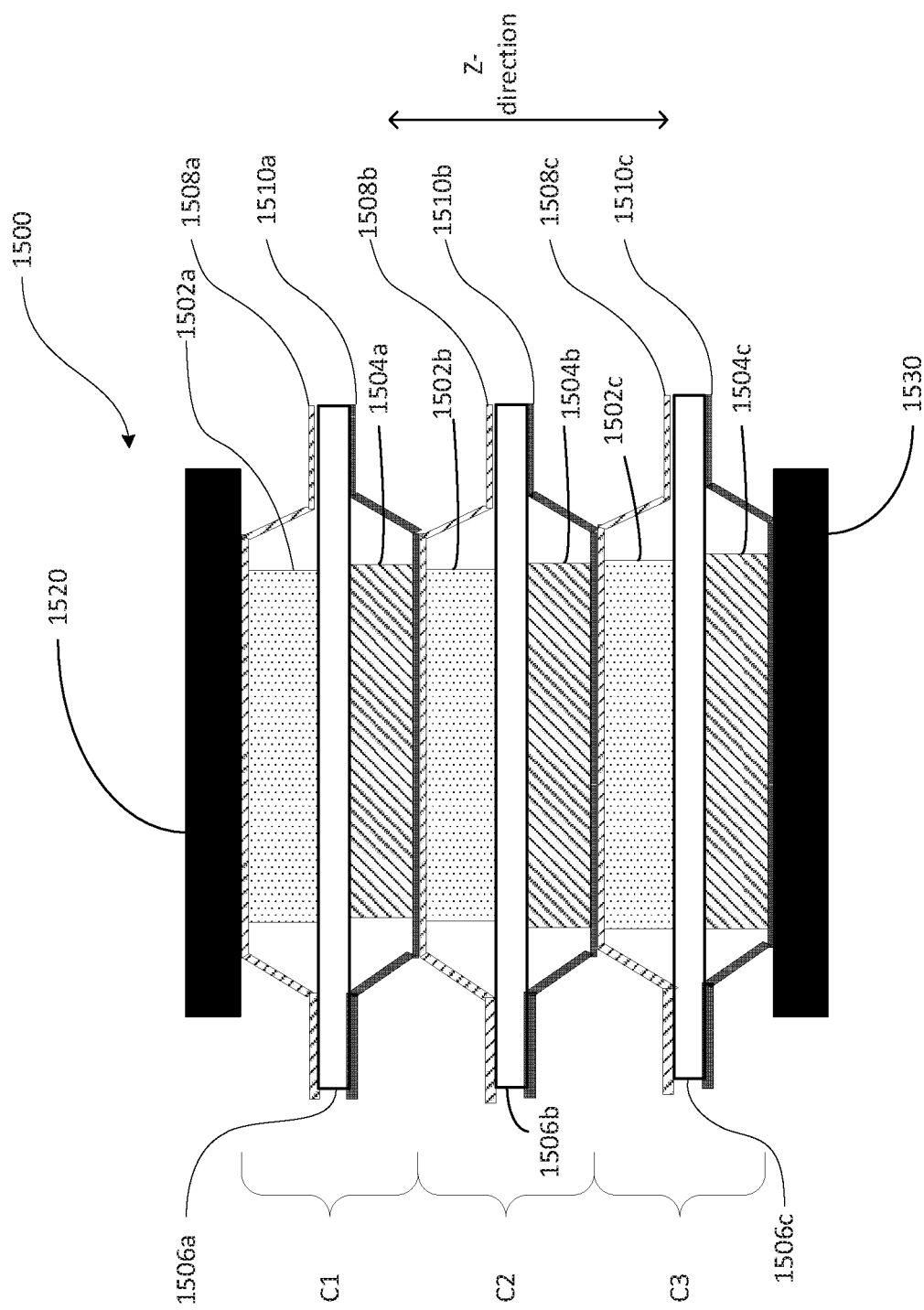
FIG. 15 depicts a schematic longitudinal sectional view of a bipolar battery in which the first and metal layers seal to the separator of each cell, in accordance with embodiments the disclosure.

FIG. 15 depicts a schematic longitudinal sectional view of a bipolar battery. As illustrated, the bipolar battery 1500 comprises a stack of electrochemical cells C1, C2, and C3 between end plates 1502 and 1504. The end plates are as otherwise described herein. As described herein, the stack of electrochemical cells can include any number of electrochemical cells depending on the selected voltage for battery 1500. The cell stack can be arranged with as many or as few electrochemical cells in series.

Electrochemical cell C1 can include cathode 1502*a* and anode 1504*a* separated by separator 1506*a* disposed between the cathode 1502*a* and anode 1504*a*. Electrochemical cell C2 can include cathode 1502*b* and anode 1504*b* separated by separator 1506*b*. Likewise, electrochemical cell C3 can include cathode 1502*c* and anode 1504*c* separated by separator 1506*c*.

In variations depicted in FIG. 15, first metal layer 1508*a* is electrically connected to first cathode layer and second metal layer 1508*a* is electrically connected to anode 1504*a*. The termini of the first metallic layer 1508*a* and second metallic layer 1510*a* are sealed to separator 1506*a*. Likewise, the termini of the first metallic layer 1508*b* and second metallic layer 1510*b* are sealed to separator 1506*b*. The termini of the first metallic layer 1508*c* and second metallic layer 1510*c* contact, and are sealed to, separator 1506*c*. As such, the first and second metallic layers can be sealed to the separator, thereby reducing components in the bipolar battery.

Figure 16A:
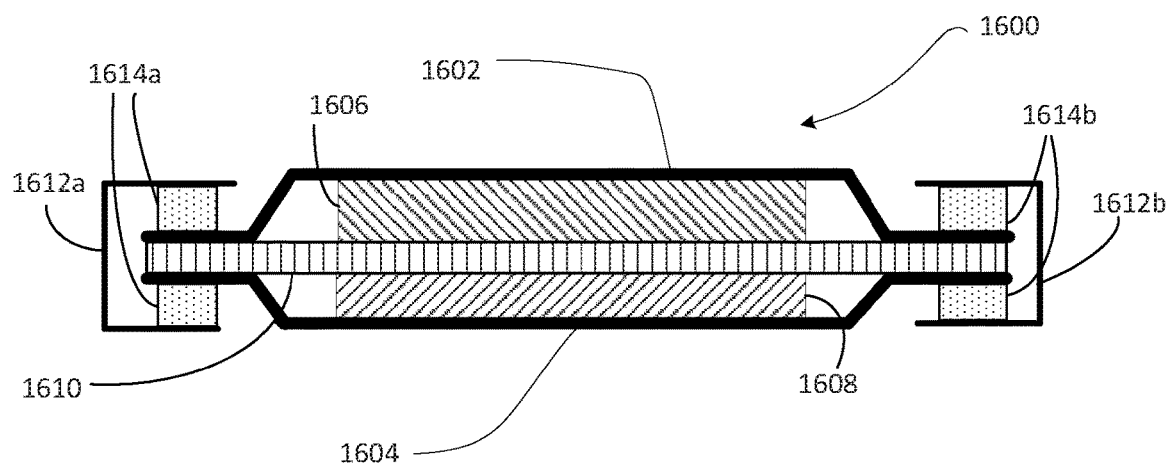
FIG. 16A depicts a battery cell sealed by sealing the first and second metal layers to the barrier layer, in accordance with embodiments the disclosure.

Bipolar cells can be sealed using a seal combined with a barrier layer. In a first variation, FIG. 16A depicts a longitudinal sectional view of battery cell 1600. Cathode 1606 and anode 1608 are separated by separator 1610. Metal layer 1602 abuts cathode 1606, and metal layer 1604 abuts anode 1608. Metal layers 1602 and 1604 are each part of separate bipolar plates. At the termini of the cell, metal layer 1602 and metal layer 1604 bind to barrier layers 1612*a* and 1612*b* via seals 1614*a* and 1614*b*, respectively. First seal 1614*a* binds metal layer 1604 to barrier layer 1612*a*. Likewise, second seal 1614*b* binds metal layer 1602 to barrier layer 1612*b*.

Figure 16B:
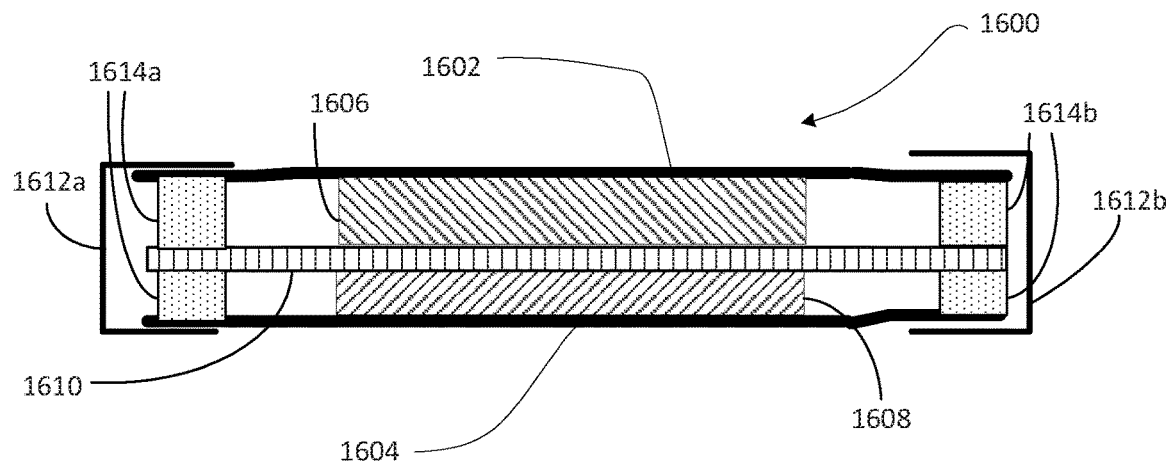
FIG. 16B depicts a battery cell sealed by sealing the first and second metal layers to the separator, in accordance with embodiments the disclosure.

In a second variation, FIG. 16B depicts a longitudinal sectional view of battery cell 1600. Again, cathode 1606 and anode 1608 are separated by separator 1610. Metal layer 1602 abuts cathode 1606 opposite the separator, and metal layer 1604 abuts anode 1608 opposite separator 1610. At the termini of the cell, first seal 1614*a* binds second metal layer 1604 to barrier layer 1612*a*. Likewise, second seal 1614*b* binds first metal layer 1602 to barrier layer 1612*b*.

It will be recognized that barrier layer 1612*a* and barrier layer 1612*b* can be any layer configured to form a barrier between the active components of battery cell 1600 and the surrounding environment. The barrier layer can serve as a moisture barrier between the battery cell and environment. In various aspects, the barrier layer can be tape. The barrier layer can also be a ceramic.

It will be recognized that first seal 1614*a* and second seal 1614*b* can be any sealing compound that can provide both an electrical and a moisture barrier. In various aspects, the seal can be any adhesive, including but not limited to, any type or formulation of polymer, epoxy, polypropylene, glue, or other similar compound. In various embodiments, the seal can be a methylized layer or ceramic coating. The first and second seals can provide electrical insulation between conductive components to prevent, or reduce the likelihood, of electrical shorting. The seals can also provide mechanical rigidity, and provide an additional moisture barrier between the battery cell and the environment. In various aspects, the first and second seals can be heat activated to heat seal barrier material to the first and second barrier layer.

Figure 17:
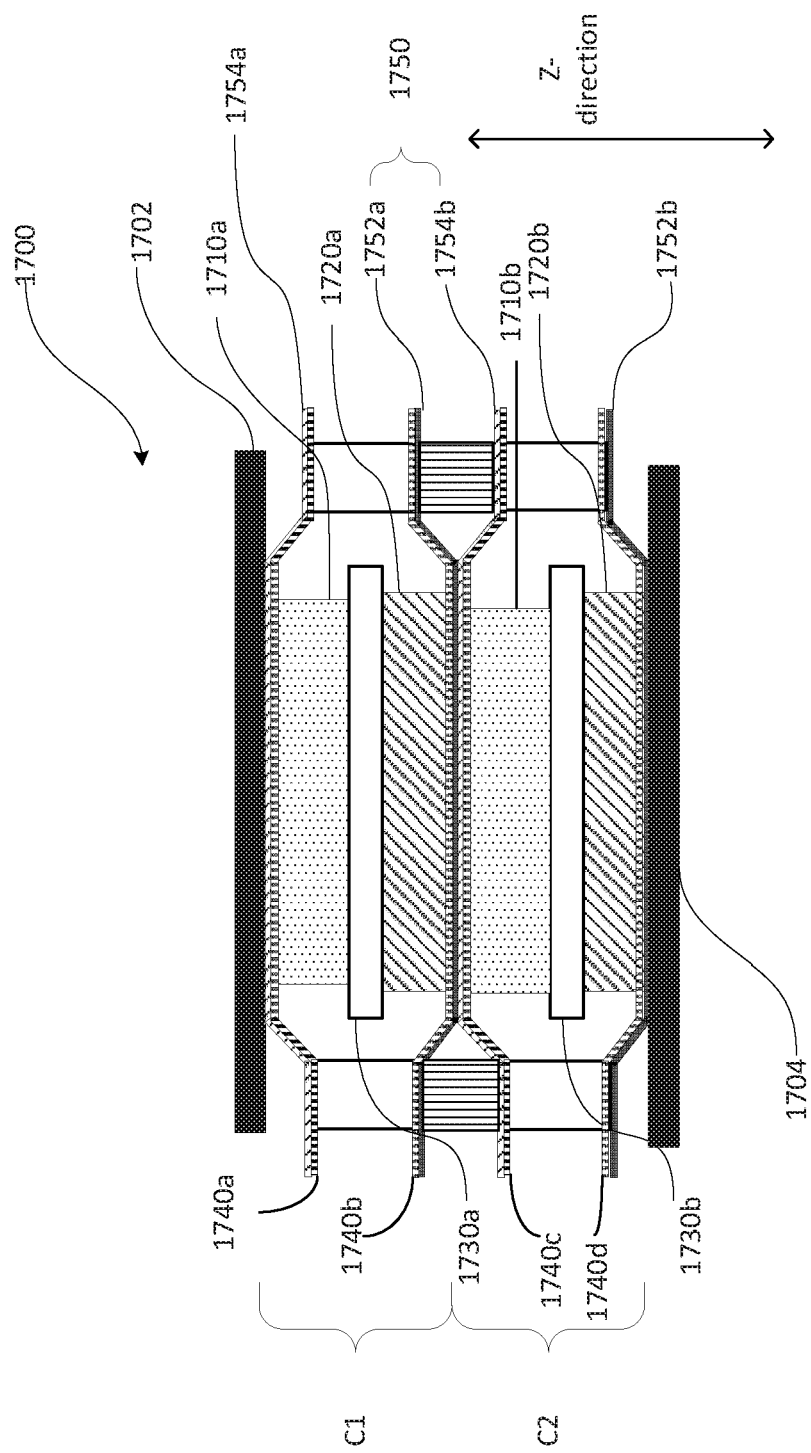
FIG. 17 depicts a bipolar battery that includes porous layers between first and second metal layers and electrodes, in accordance with embodiments the disclosure.

In other aspects, the bipolar battery can include one or more porous layers between metal layers and cathode, and/or metal layer and anode, which serve as paths to add electrolyte. FIG. 17 depicts bipolar battery 1700 comprising a stack of electrochemical cells C1 and C2 between end plates 1702 and 1704. End plates 1702 and 1704 can be metal current collector plates, which serve both electrical and mechanical functions. Cell C1 includes a cathode 1710a and an anode 1720a separated by separator 1730a. Likewise, Cell C2 includes a cathode 1710b and an anode 1720b separated by separator 1730b. Bipolar plate 1750 is disposed between anode 1720a of C1 and cathode 1710b of adjacent cell C2. Bipolar plate 1750 includes first metal layer 1752a electrically connected to second metal layer 1754b.

Porous layers are disposed between each metal layer and its corresponding electrode (i.e. cathode or anode). Specifically, porous layer 1740a is disposed between second metal layer 1754a and cathode 1710a. Porous layer 1740b is disposed between first metal layer 1752a and anode 1720a. Porous layer 1740c is disposed between first metal layer 1752b and cathode 1710b. Porous layer 1740d is disposed between second metal layer 1754a and anode 1720b.

Porous layers 1740a, 1740b, 1740c, and 1740d are electrically conductive in the Z-direction, while fluidically conductive normal to the Z-direction. The electrical conductivity of porous layers 1740a, 1740b, 1740c, and 1740d allows electricity generated by the bipolar battery to be transmitted in the Z-direction. Further, the fluid conductivity of porous layers 1740a, 1740b, 1740c, and 1740d allows electrolytes to flow to the electrodes (i.e., cathodes and/or anodes) in bipolar battery 1700. In various embodiments, porous layers need not be associated with each electrode, or both cathodes and anodes.

Porous layers 1740a, 1740b, 1740c, and 1740d can include one or more materials that are both porous and electrically conductive. Non-limiting examples of such materials include sintered metal, perforated metal, and foam metal. In various additional alternatives, the material can be a mesh material. In various embodiments, porous layers 1740a, 1740b, 1740c, and 1740d can also be configured to transport gases out of the bipolar battery. The material can be configured to transport additional liquid (e.g., electrolyte) passively based on capillary action, such as with a wick. Alternatively, additional liquid can be actively added to porous layers.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A battery comprising:
a first cell and a second cell disposed in a stacked orientation;
a seal disposed between the first cell and the second cell; and
an electrically conductive plate connecting the first cell with the second cell,
wherein the electrically conductive plate comprises a first metal layer and a second metal layer in direct contact with one another,
wherein the electrically conductive plate has a connection region and a gap region,
wherein the first metal layer and the second metal layer extend away from one another in the gap region to provide a separation between the first metal layer and the second metal layer,
wherein the seal is configured to expand to accommodate an increase of at least 10% of a distance separating the first metal layer and the second metal layer in the gap region in a direction of the stacked orientation while remaining sealed,
wherein the first cell contacts the first metal layer in the connection region, and wherein the second cell contacts the second metal layer in the connection region.

2. The battery according to claim 1, wherein electrical current flows between the first cell and second cell through the electrically conductive plate, when the battery connects to a current source.

3. The battery according to claim 1, wherein the seal is disposed in the gap region.

4. The battery of claim 1, wherein the seal is an elastomeric material comprising a silicon-based material, a rubber, polyethylene, or ethylene propylene diene monomer.

5. The battery according to claim 1, wherein the first cell and second cell each comprise a cathode, an anode, a separator, and electrolyte.

6. The battery according to claim 5, wherein the electrolyte of the first cell and of the second cell are sealed in the respective cell.

7. The battery according to claim 5, wherein the separator of the first cell is coated with ceramic materials.

8. The battery according to claim 1, wherein the electrically conductive plate permits current flow between the first cell and the second cell, and wherein each of the first cell and the second cell comprises a voltage balancing circuit that permits current flow in or out of the respective cell to change a voltage output of the respective cell.

9. The battery according to claim 1, wherein the electrically conductive plate is fluidly porous.

10. The battery according to claim 9,
wherein the first cell and second cell form a first cell stack and are disposed between a first conductive plate and a second conductive plate separate from the electrically conductive plate, and wherein the battery further comprises:
a third cell and a fourth cell forming a second cell stack, the second cell stack disposed between the second conductive plate and a third conductive plate.

11. The battery according to claim 10, wherein the first conductive plate, second conductive plate, and third conductive plate is each fluidly porous.

12. The battery according to claim 1, further comprising a thermally sensitive layer disposed in the connection region between the first cell and the second cell, wherein the thermally sensitive layer is electrically conducting below a temperature threshold and electrically insulating above the temperature threshold.

13. The battery of claim 1, wherein a first surface of the first metal layer is coupled with a first surface of the second metal layer in the connection region.

14. The battery of claim 13, wherein the seal extends between the first surface of the first metal layer and the first surface of the second metal layer in the gap region.

15. The battery of claim 1, wherein the seal does not extend beyond lateral edges of the first metal layer and the second metal layer in the gap region.

16. The battery of claim 1, wherein the seal is maintained free of direct contact with an electrolyte of the first cell or the second cell.

17. The battery of claim 1, wherein the seal is a first seal, the battery further comprising:
   a second seal, wherein the first cell comprises a current collector, and wherein the second seal is coupled between the current collector of the first cell and the first metal layer of the electrically conductive plate.

18. The battery of claim 17, wherein the second seal is in contact with an electrolyte of the first cell.

* * * * *